(12) United States Patent
Arimitsu

(10) Patent No.: US 12,088,220 B2
(45) Date of Patent: Sep. 10, 2024

(54) VIBRATING ACTUATOR, MULTI-AXIS STAGE, ARTICULATED ROBOT, AND CONTINUUM ROBOT

(71) Applicant: CANON KABUSHIKI KAISHA, Tokyo (JP)

(72) Inventor: Yasumichi Arimitsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 17/893,855

(22) Filed: Aug. 23, 2022

(65) Prior Publication Data
US 2023/0060266 A1 Mar. 2, 2023

(30) Foreign Application Priority Data

Aug. 31, 2021 (JP) ................. 2021-141411

(51) Int. Cl.
*H02N 2/02* (2006.01)
*B25J 9/10* (2006.01)
*B25J 9/06* (2006.01)
*B25J 9/16* (2006.01)

(52) U.S. Cl.
CPC .............. *H02N 2/026* (2013.01); *B25J 9/104* (2013.01); *H02N 2/028* (2013.01); *B25J 9/065* (2013.01); *B25J 9/1625* (2013.01)

(58) Field of Classification Search
CPC ......... H02N 2/026; H02N 2/028; B25J 9/104; B25J 9/065; B25J 9/1625
See application file for complete search history.

(56) References Cited

U.S. PATENT DOCUMENTS 7,834,527 B2\* 11/2010 Alvarez Icaza Rivera ................. H10N 30/302
310/800
2014/0210312 A1\* 7/2014 Mori ...................... H10N 30/88
310/326

FOREIGN PATENT DOCUMENTS

JP 2000-324865 A 11/2000
JP 2018-140101 A 9/2018

\* cited by examiner

*Primary Examiner* — Emily P Pham
(74) *Attorney, Agent, or Firm* — Canon U.S.A., Inc. IP Division

(57) ABSTRACT

A vibrating actuator includes a vibrator and a contact body. The vibrator includes an elastic body and an electrical-mechanical energy transducer. The contact body is long in a predetermined direction and contacts the vibrator. The vibrator and the contact body are relatively moved in the predetermined direction by vibration of the vibrator. An end portion of the long contact body is covered with a viscoelastic body circumferentially with respect to the predetermined direction.

22 Claims, 18 Drawing Sheets

FIG.2A
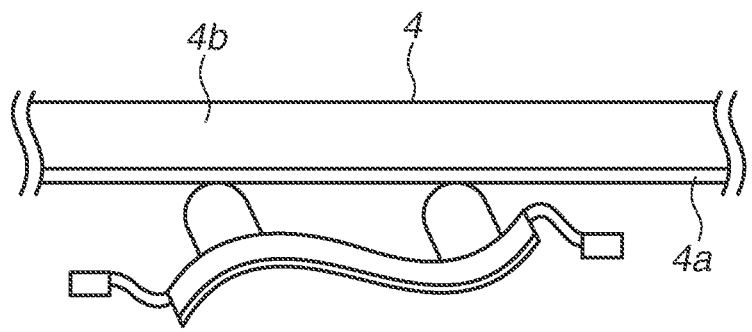
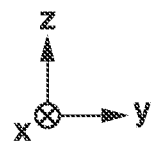
FIG.2B
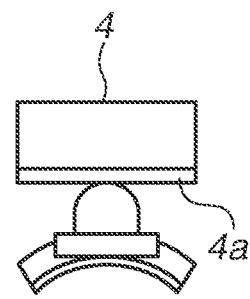
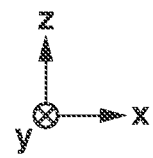
FIG.2C
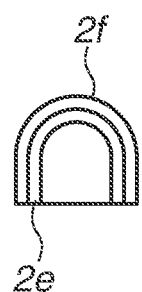

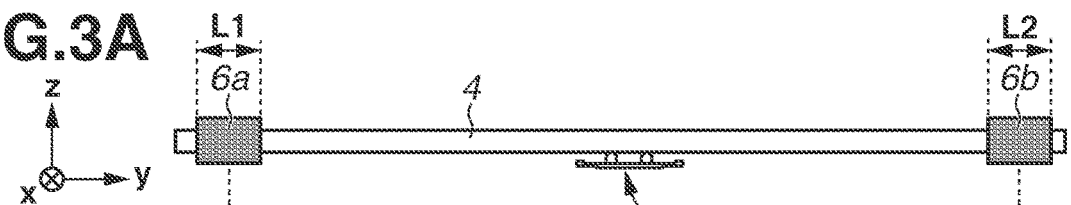
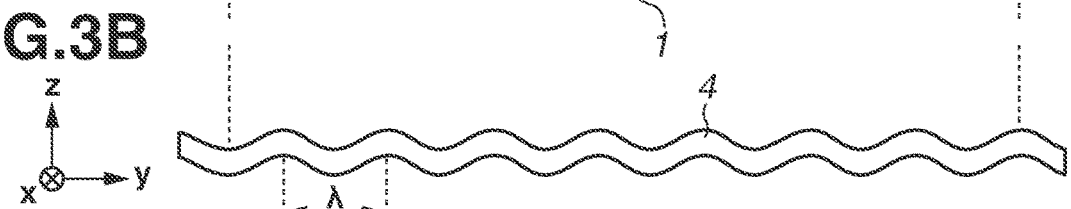
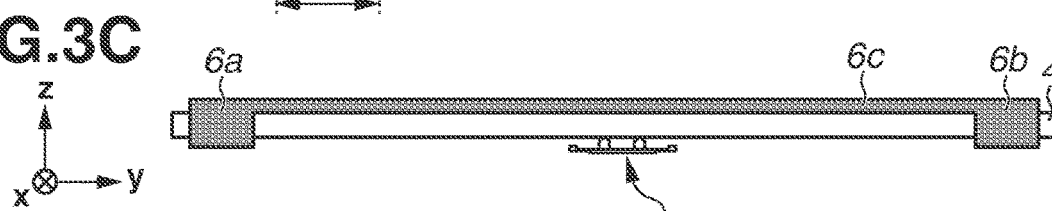
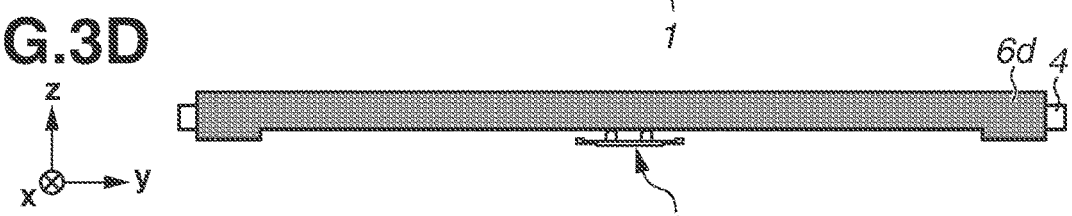
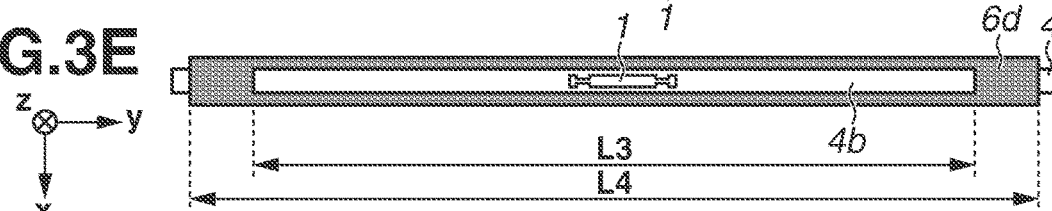
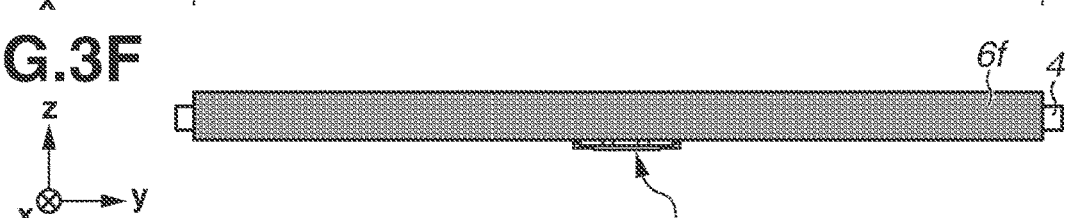
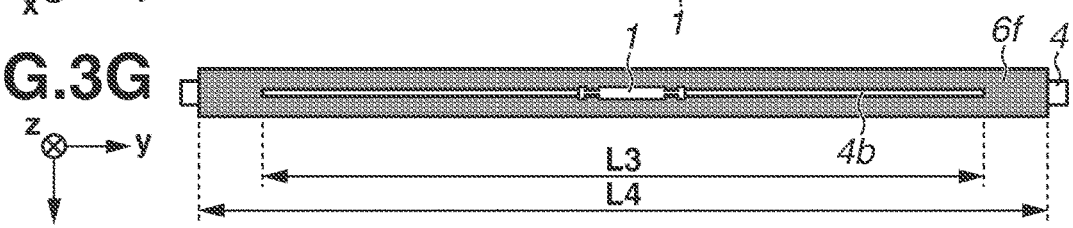
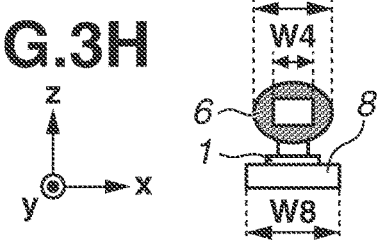
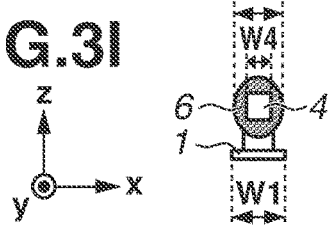

FIG.4
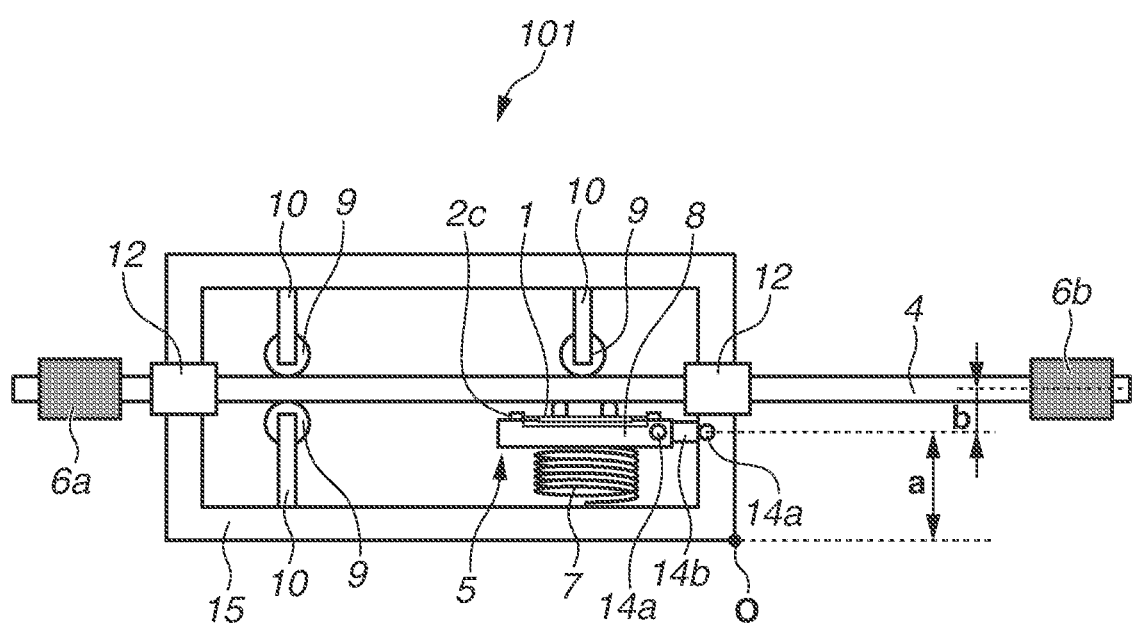
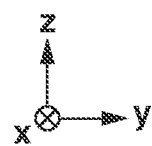

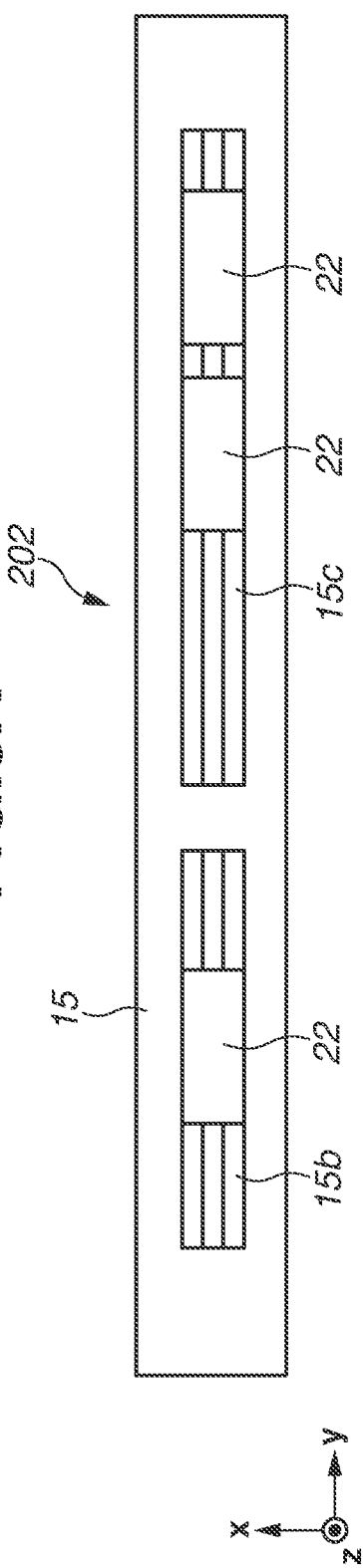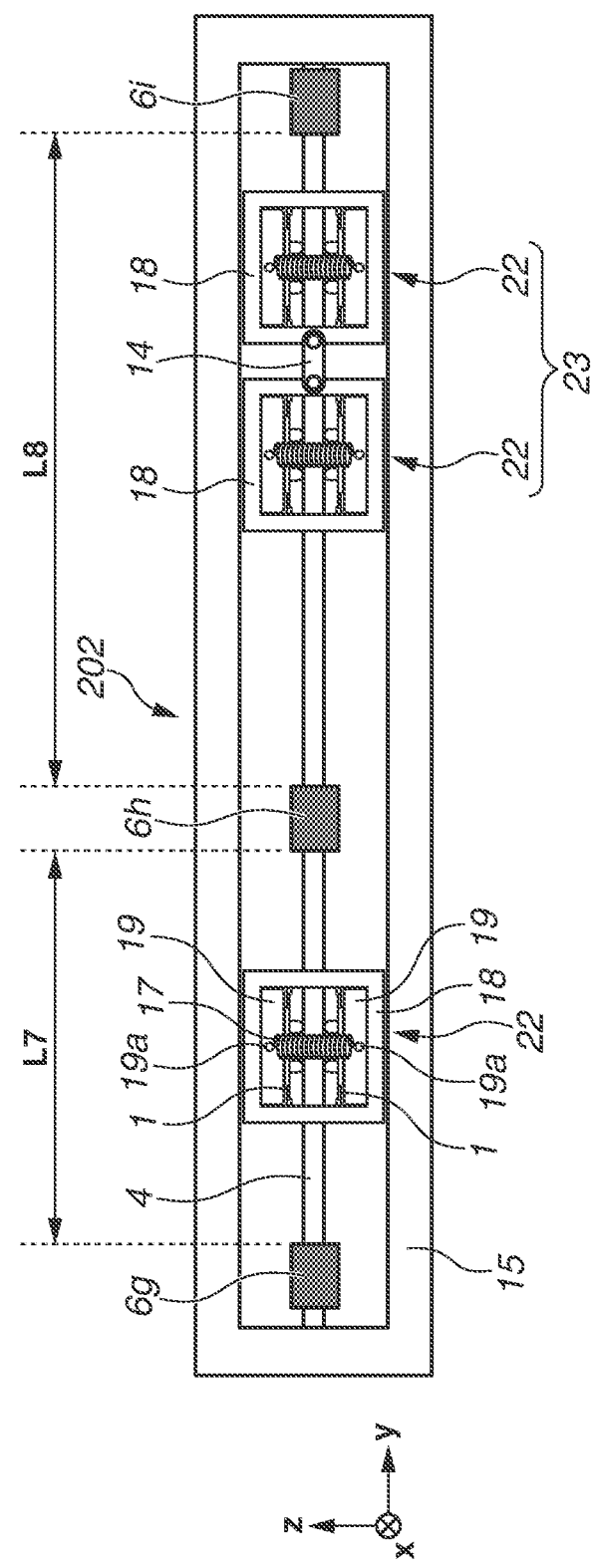

FIG.12A
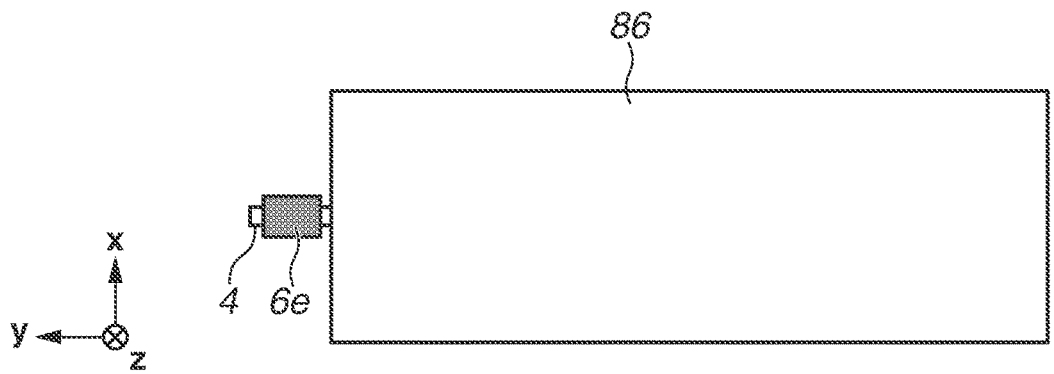
FIG.12B  FIG.12C
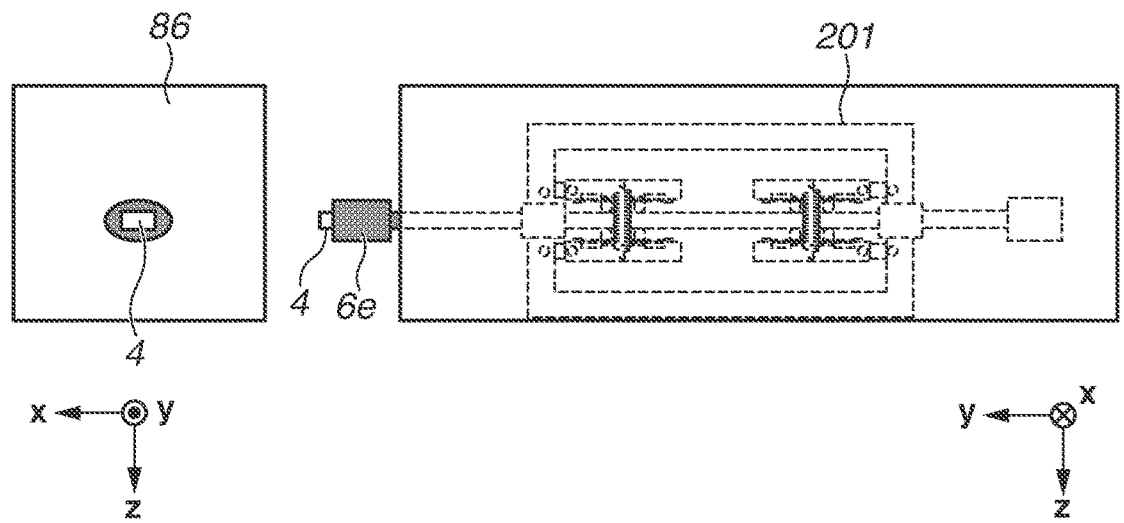
FIG.12D
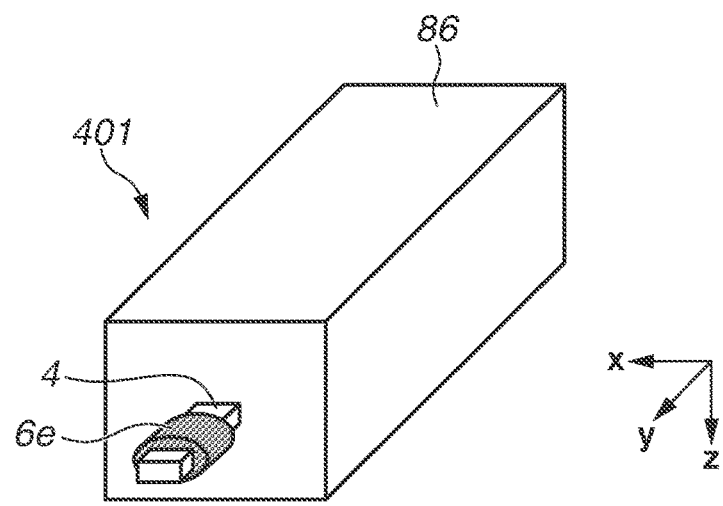

VIBRATING ACTUATOR, MULTI-AXIS STAGE, ARTICULATED ROBOT, AND CONTINUUM ROBOT

BACKGROUND

Field

The present disclosure relates to a vibrating actuator, a multi-axis stage, an articulated robot, and a continuum robot in which a vibrator and a contact body move relative to each other.

Description of the Related Art

There have been discussed vibrating actuators that produce thrust between a vibrator and a contact body by causing the vibrator to generate vibrations combining different vibration modes and vibrating actuators that change friction force between a vibrator and a contact body by exciting vibrations in a single vibration mode.

Japanese Patent Application Laid-Open No. 2000-324865 discusses a vibration absorbing member disposed between a relative movement member (contact body) and a second base member to prevent the occurrence of noise (also referred to as a creak) due to unwanted vibrations and a drop in driving efficiency. This configuration is discussed to absorb unwanted vibrations occurring on the relative movement member (contact body) by elliptical motion produced by the vibrator.

However, the configuration discussed in Japanese Patent Application Laid-Open No. 2000-324865 tends to have low output per volume or weight, and has low space use efficiency. A first reason is that the second base member for supporting one surface of the relative movement member (contact body) is needed. The second base member is larger than the relative movement member (contact body). This increases the size of the entire ultrasonic motor (vibrating actuator) and makes miniaturization difficult. A second reason is that the vibration absorption member is disposed entirely between the relative movement member (contact body) and the second base member, and the surface available for frictional sliding of the relative movement member (contact body) is inevitably limited. The surface of the relative movement member (contact body) opposite the frictional sliding surface is thus unable to be used for driving since the vibration absorption member is bonded thereto.

SUMMARY

The present disclosure is directed to providing a vibrating actuator, an apparatus, a multi-axis stage unit, an articulated robot, and a continuum robot that can reduce unwanted vibrations occurring on the vibrating actuator and increase output per volume.

According to an aspect of the present disclosure, a vibrating actuator includes a vibrator including an elastic body and an electrical-mechanical energy transducer, and a contact body that is long in a predetermined direction and configured to contact the vibrator, wherein the vibrator and the contact body are configured to be relatively moved in the predetermined direction by vibration of the vibrator, wherein an end portion of the long contact body is covered with a viscoelastic body circumferentially with respect to the predetermined direction.

Further features of the present disclosure will become apparent from the following description of exemplary embodiments with reference to the attached drawings.

BRIEF DESCRIPTION OF THE DRAWINGS

FIGS. 2A to 2C are schematic diagrams for describing vibration modes excited on the vibrator.

FIGS. 3A to 3I are front views, bottom views, and side views illustrating schematic configurations of a vibrating actuator according to a first exemplary embodiment.

FIG. 4 is a front view illustrating a schematic configuration of a vibrating actuator according to the first exemplary embodiment.

FIGS. 8A and 8B are a plan view and a front view illustrating a schematic configuration of a vibrating actuator according to the second exemplary embodiment.

FIGS. 12A to 12D are diagrams for describing a schematic configuration of an actuator unit according to a third exemplary embodiment.

DESCRIPTION OF THE EMBODIMENTS

Some exemplary embodiments of the present disclosure will be described in detail below with reference to the attached drawings.

Figure 1A:
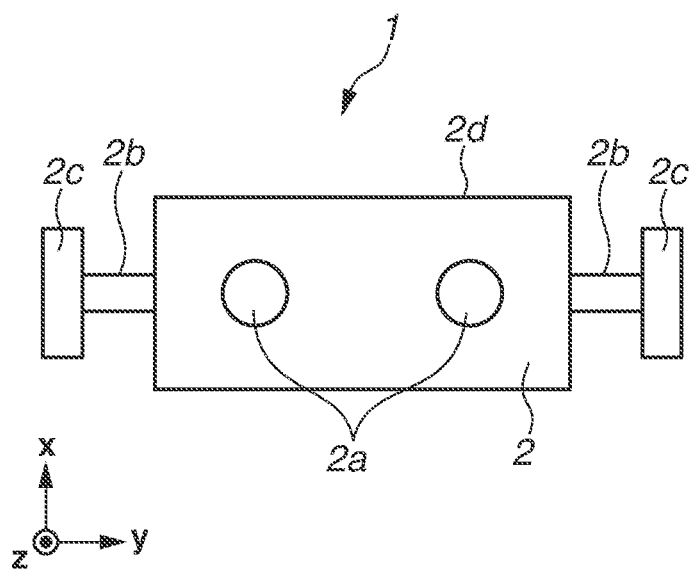
FIGS. 1A to 1C are diagrams illustrating a schematic configuration of a vibrator.
Figure 1B:
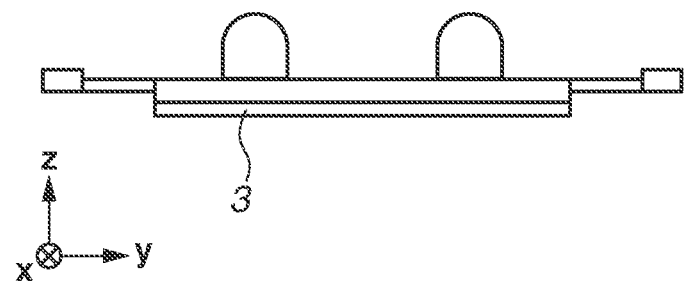
Figure 1C:
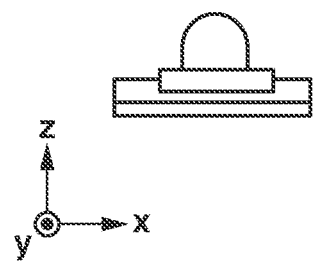

A vibrator and a contact body used in common for vibrating actuators according to the exemplary embodiments to be described below will initially be described. FIG. 1A is a plan view illustrating a schematic configuration of a vibrator 1 constituting a vibrating actuator. FIG. 1B is a front view of the vibrator 1. FIG. 1C is a side view of the vibrator 1.

For convenience of description, an orthogonal coordinate system including an x-axis (x direction), a y-axis (y direction), and a z-axis (z direction) is set with respect to the vibrator 1 as illustrated in FIGS. 1A to 1C. The z direction is a thickness direction of the vibrator 1 and a direction in which protrusions 2a (details will be described below) disposed at two positions are protruded. The y direction is a longitudinal direction of the vibrator 1 and a direction connecting the two protrusions 2a. The x direction is a transverse direction (width direction) of the vibrator 1 and a direction orthogonal to the y and z directions. Each of the directions illustrated in FIG. 1 is referred to as a positive direction (+ direction) when seen from the start point to the end point of the arrow indicating the direction, and a negative direction (− direction) when seen from the end point to the start point.

The vibrator 1 includes an elastic body 2 having elasticity and an electrical-mechanical energy transducer 3 bonded to the elastic body 2. An example of the electrical-mechanical energy transducer 3 is a piezoelectric element that converts a voltage into force by an inverse piezoelectric effect, and is formed by disposing electrodes to which a predetermined voltage is applied on the front and back of a thin rectangular plate of piezoelectric ceramics. The elastic body 2 includes the protrusions 2a, suspensions 2b, support ends 2c, and a base portion 2d. The two protrusions 2a are disposed to protrude in the +z direction from the surface of the base portion 2d in a rectangular plate shape opposite to where the electrical-mechanical energy transducer 3 is bonded. The protrusions 2a and the base portion 2d may be integrally formed by pressing. Protrusion members may be bonded to the base portion 2d by a predetermined method. The support ends 2c are rectangular plate-like portions for fixing the vibrator 1 to a holding unit 8 to be described below. The suspensions 2b are rectangular plate-like portions having the function of connecting the base portion 2d and the support ends 2c.

The protrusions 2a will now be described in more detail. FIG. 2C is a sectional view illustrating a schematic structure of a protrusion 2a. A friction member 2f is disposed on the surface of a base member 2e of the protrusion 2a. The material of the base member 2e is the same as that of the base portion 2d (not illustrated in FIG. 2C). If the base member 2e is formed of martensitic stainless steel, the friction member 2f can be an electroless nickel plating film, a chromium plating film, a quench-hardened layer, or an ion-nitrided coating. The base member 2e may be configured to also serve as the friction member 2f (in such a case, there is no distinction between the base member 2e and the friction member 2f) by forming the base member 2e of fiber-reinforced engineering plastics such as polyetheretherketone (PEEK)-CF30, or hard ceramics.

Next, two vibration modes to be excited on the vibrator 1 will be described. FIG. 2A is a schematic diagram for describing a first vibration mode excited on the vibrator 1. FIG. 2B is a schematic diagram for describing a second vibration mode excited on the vibrator 1. FIGS. 2A and 2B illustrate the deformation of the vibrator 1 in an exaggerated manner. For convenience of description, FIGS. 2A and 2B illustrate a contact body 4 that contacts the vibrator 1 and receives thrust (frictional driving force) from the vibrator 1.

The contact body 4 is a member long in the y direction in the drawings and configured to make contact with the protrusions 2a of the vibrator 1. The vibrator 1 and the contact body 4 are configured to be relatively movable in the y direction by vibrations generated by the vibrator 1. The contact between the contact body 4 and the vibrator 1 is not limited to direct contact without any other member interposed between the contact body 4 and the vibrator 1. The contact between the contact body 4 and the vibrator 1 may be indirect contact with another member interposed between the contact body 4 and the vibrator 1 as long as the vibrator 1 and the contact body 4 are relatively moved by the vibrations generated by the vibrator 1.

"Another member" is not limited to one independent of the contact body 4 and the vibrator 1 (such as a high friction member formed of a sintered material). "Another member" may be a surface-treated portion of the contact body 4 or the vibrator 1, formed by plating or a nitriding treatment.

The first vibration mode illustrated in FIG. 2A is a secondary out-of-plane bending vibration mode where three nodal lines substantially parallel to the x direction appear on the base portion 2d. This vibration mode excites vibrations to move in the y direction at the ends of the two protrusions 2a. The second vibration mode illustrated in FIG. 2B is a primary out-of-plane bending vibration mode where two nodal lines substantially parallel to the y direction appear on the base portion 2d. This vibration mode excites vibrations to move in the z direction at the ends of the two protrusions 2a.

If a plurality of alternating voltages with different phases is applied to the electrical-mechanical energy transducer 3 to excite vibrations in the first and second vibration modes, elliptical motion within a yz plane can be generated at the ends of the two protrusions 2a. The elliptical motion within the yz plane gives the contact body 4 thrust in the y direction, whereby the vibrator 1 and the contact body 4 can be relatively moved in the y direction.

With no voltage applied to the electrical-mechanical energy transducer 3, the static friction force between the protrusions 2a and the contact body 4 functions as a holding force for maintaining the relative position between the vibrator 1 and the contact body 4. Moreover, the duration of contact between the protrusions 2a and the contact body 4 can be adjusted to change apparent friction force by adjusting the voltages applied to the electrical-mechanical energy transducer 3 to adjust the amplitude of vibrations excited on the vibrator 1. For example, the friction force occurring between the protrusions 2a and the contact body 4 can be reduced by exciting the vibrations of the second vibration mode on the vibrator 1 and increasing the vibration amplitude.

Suppose, for example, that the contact body 4 is configured to move with respect to the vibrator 1. By performing the foregoing controls, the magnitude of reaction force in moving the contact body 4 by applying external force other than the contact pressure with the vibrator 1 to the contact body 4 can be adjusted. This, for example, can adjust operating reaction force that a user receives when the user moves the contact body 4 by directly applying external force to the contact body 4.

In the vibrating actuator illustrated in FIGS. 2A to 2C, the ends of the protrusions 2a are in contact with the contact body 4.

The contact body 4 includes a friction member 4a disposed at the surface (frictional sliding surface) to contact the protrusions 2a. The friction members 2f are disposed at the surfaces of the protrusions 2a. This can provide stable frictional sliding characteristics between the elastic body 2 and the contact body 4. The material and the forming method of the friction member 4a are similar to those of the friction members 2f.

Next, the materials used for the vibrator 1 and the contact body 4 will be described. Examples of the material of the elastic body 2 include martensitic stainless steel with low vibration loss, and high-toughness ceramics such as partially stabilized zirconia (PSZ). Other examples include engineering plastics (fiber reinforced plastics [FRPs]) such as PEEK reinforced with approximately 30% by weight of carbon fiber (PEEK-CF30), semiconductors such as silicon carbide (SiC), and aluminum alloys. The electrical-mechanical energy transducer 3 is formed of piezoelectric ceramics such as lead zirconate titanate (PZT). The contact body 4 is formed of martensitic stainless steel, an aluminum alloy, FRPs such as PEEK-CF30, or fine ceramics such as PSZ and alumina (aluminum oxide). Note that the materials (substances) used for the vibrator 1 and the contact body 4 are not limited to the foregoing.

FIGS. 3A to 3I are schematic illustrations of the contact body 4 and the vibrator 1 for the sake of describing the vibrating actuator according to the first exemplary embodiment of the present disclosure. The vibrating actuator according to the present exemplary embodiment includes the vibrator 1 including the elastic body 2 and the electrical-mechanical energy transducer 3, and the contact body 4 that is long in a predetermined direction and contacts the vibrator 1. The vibrating actuator is configured so that the vibrator 1 and the contact body 4 are relatively moved in the predetermined direction by vibrations of the vibrator 1. The vibrating actuator is characterized in that end portions of the long contact body 4 are covered with viscoelastic bodies in the circumferential direction with respect to the predetermined direction.

FIG. 3A is a front view of the contact body 4 and one vibrator 1 pressed against the contact body 4. Cylindrical viscoelastic bodies 6a and 6b are fitted to both ends of the contact body 4. FIGS. 3H and 3I are right side views thereof. An x direction, a y direction, and a z direction are set as illustrated in FIGS. 3A to 3I, based on the x, y, and z directions set for the vibrator 1. The y direction of the vibrating actuator, including those according to other exemplary embodiments to be described below, will be referred to as the lateral direction of the vibrating actuator, with the +y side as the right and the −y side as the left. The z direction will be referred to as the vertical direction of the vibrating actuator, with the +z side up and the −z side down. An example of a method for pressing the vibrator 1 against the contact body 4 will be described below. FIG. 3B is a front view of the contact body 4, illustrating the out-of-plane bending mode occurring on the contact body 4 in an exaggerated manner. If the vibrator 1 is excited in either one or both of the first and second vibration modes and the frequency or frequencies of the vibration mode(s) is/are close to the natural frequency of the contact body 4 in its natural vibration mode, the contact body 4 is excited in the natural vibration mode. For example, suppose that the contact body 4 is excited in an out-of-plane vibration mode such as illustrated in FIG. 3B where the contact body 4 vibrates at a wavelength λ in the z direction with respect to a plane parallel to the xy plane. In such a case, the contact body 4 and the protrusions 2a of the vibrator 1 intermittently repeat a contact state and a non-contact state. This causes beating noise with a drop in thrust. Moreover, the difference between a driving frequency at which the vibrator 1 is excited to vibrate and the natural frequency of the contact body 4 in the natural vibration mode can sometimes produce a creak along with a drop in thrust. As illustrated in FIG. 3A, the cylindrical viscoelastic bodies 6a and 6b are closely fitted to the contact body 4. The contact body 4 and the viscoelastic bodies 6a and 6b are thereby closely contacted at locations where distortion occurs due to the deformation of the contact body 4 in the natural vibration mode of the contact body 4 occurring as unwanted vibrations. As a result, the vibrating energy can be absorbed to reduce the amplitude of the unwanted vibrations by using the expansion and contraction of the viscoelastic bodies 6a and 6b. Now, a desired shape of the viscoelastic bodies 6a and 6b will be described. In the present exemplary embodiment, the viscoelastic bodies 6a and 6b have a cylindrical shape, and the contact body 4 a bar-like rectangular solid shape. Here, the viscoelastic bodies 6a and 6b desirably contact the four surfaces of the contact body 4. In other words, the total outer peripheral dimension of a cross section of the contact body 4 parallel to an xz cross section is desirably somewhat longer than the inner peripheries of the viscoelastic bodies 6a and 6b unattached. In general, if viscoelastic bodies are attached by using only the stickiness of the viscoelastic bodies, distorting locations of the contact body 4 and the viscoelastic bodies are difficult to be perfectly contacted together. The resulting interposition of a slight air layer makes the absorption of the vibrating energy difficult and lowers the effect of reducing unwanted vibrations. If the viscoelastic bodies are bonded using an adhesive, the interposition of the adhesive layer between the viscoelastic bodies and the contact body makes the viscoelastic effect of the adhesive layer dominant over that of the viscoelastic bodies, making the high vibration-isolating effect of butyl rubber and the like unavailable. In the present exemplary embodiment, tubular viscoelastic members 6a and 6b having a hole of which the unstretched cross-sectional area is smaller than the xz cross-sectional area of the contact body 4 can be used by utilizing the elasticity of the viscoelastic members 6a and 6b. In other words, when the viscoelastic bodies 6a and 6b are not attached to the contact body 4, the inner peripheries of the tubular members are smaller than the total peripheral length of the contact body 4 in a cross section with its normal in the predetermined direction.

Attaching the viscoelastic bodies 6a and 6b to the contact body 4 by radially stretching the holes can prevent the interposition of an air layer or adhesive layer and increase the area of the regions where the inner sides of the viscoelastic bodies 6a and 6b make close contact with the contact body 4. The greater the lengths of the viscoelastic bodies 6a and 6b in the y direction, the more locations where the contact body 4 is distorted by unwanted vibrations can be covered. Since the amount of absorption of the vibrating energy by the viscoelastic bodies 6a and 6b increases, the effect of reducing unwanted vibrations is high. For example, suppose that the two viscoelastic bodies 6a and 6b illustrated in FIG. 3A have a dimension of L1 and L2 in the y direction, respectively. In such a case, the sum of L1 and L2 is desirably greater than or equal to the one-half wavelength (greater than or equal to λ/2) of the vibration waves in the vibration mode of vibrations excited on the contact body 4 by the vibrations illustrated in FIG. 3B. As another criterion for setting the dimensions of the viscoelastic bodies 6a and 6b, the sum of L1 and L2 is desirably greater than or equal to the distance between the adjoining protrusions 2a, which is equivalent to approximately one wavelength of the first vibration mode excited on the vibrator 1. If the viscoelastic bodies 6a and 6b are not disposed on both ends but a viscoelastic body is disposed on either one end alone, the dimension of the viscoelastic body in the y direction can be greater than or equal to the sum of L1 and L2. The total length of the dimensions of the viscoelastic bodies 6a and 6b in the y direction is also desirably greater than or equal to the distance between adjoining nodal lines of vibrations occurring on the vibrator 1.

Moreover, the total length of the dimensions of the viscoelastic bodies 6a and 6b in the y direction is desirably greater than or equal to the distance between the centers of the adjoining protrusions 2a of the elastic body 2 constituting the vibrator 1.

Next, the positions of the viscoelastic bodies 6a and 6b will be described. The viscoelastic bodies 6a and 6b are desirably located to cover antinodes of the vibration mode where the contact body 4 is most distorted by the unwanted vibrations. This can make the unwanted vibrations attenuate more effectively. Suitable materials of the viscoelastic bodies 6a and 6b will now be described. The viscoelastic bodies 6a and 6b are suitably formed of a material having both viscosity and elasticity. Examples include rubber and resin. Particularly suitable rubber materials include butadiene rubber, butyl rubber, and silicone rubber having high vibration isolation performance. The viscoelastic bodies 6a and 6b can be formed at low cost by cutting up a hollow (tubular) molded article of rubber material or resin material. By fitting the cylindrical viscoelastic bodies 6a and 6b illustrated in FIG. 3A, unwanted vibrations can thus be reduced without increasing the size of the vibrating actuator.

Next, the width dimensions of the contact body 4 and a viscoelastic body 6 will be described with reference to FIGS. 3H and 3I. FIG. 3H is a right side view where the vibrator 1 is supported by a holding unit 8 to be described below.

The width dimensions of the contact body 4, the viscoelastic body 6, and the holding unit 8 in the x direction will be denoted by W4, W6, and W8, respectively. The vibrating actuator can be miniaturized by setting W4≤W8 or W6≤W8 as illustrated in FIG. 3H.

In other words, the vibrating actuator can be miniaturized by making the width dimension of the viscoelastic body 6 smaller than the width dimension of the vibrator 1 or that of the holding unit 8 in a cross section of the vibrating actuator orthogonal to the predetermined direction.

As illustrated in FIG. 3I, the vibrating actuator can be further miniaturized by setting W4≤W1 or W6≤W1, where W1 is the width dimension of the vibrator 1 in the x direction.

Next, exemplary embodiments of the viscoelastic bodies for further enhancing the effect of reducing unwanted vibrations according to the present exemplary embodiment will be described with reference to FIGS. 3C to 3G. FIG. 3C is a front view of the vibrating actuator, illustrating a state where a viscoelastic body 6c is attached to the surface of the contact body 4 opposite the frictional sliding surface where the vibrator 1 contacts the contact body 4 in addition of the configuration of the viscoelastic bodies 6a and 6b illustrated in FIG. 3A. The configuration of the viscoelastic bodies 6a to 6c illustrated in FIG. 3C can enhance the effect of reducing unwanted vibrations occurring on the contact body 4 compared with the configuration of the viscoelastic bodies 6a and 6b illustrated in FIG. 3A. Here, the viscoelastic bodies 6a, 6b, and 6c can be formed separately or integrally. The surface of the contact body 4 where the vibrator 1 makes contact with the contact body 4 includes an exposed area where no viscoelastic body is disposed in the y-axis direction. This exposed area is located over a length such that the relative movement of the vibrator 1 and the contact body 4 is not interfered in the y-axis direction and the circumferential direction with respect to the y-axis. The length of the exposed area in the y-axis direction can be configured to be longer than the area of relative movement of the vibrator 1 and the contact body 4. The width of the exposed area in the x-axis direction can be configured to be greater than the width of the vibrator 1 itself or the width of the protrusions 2a.

FIGS. 3D and 3E illustrate another example of the configuration of the vibrating actuator. FIG. 3D is a front view of the vibrating actuator, illustrating a state where a viscoelastic body 6d is attached to the contact body 4. FIG. 3E is a bottom view thereof. The viscoelastic body 6d has a length of L4 in the y direction, and has a window for forming an exposed area having a dimension of L3 in the y direction in the bottom of the midsection.

As illustrated in the diagrams, the viscoelastic body 6d is attached to the contact body 4 so that a frictional sliding surface 4b is exposed to enable contact with the vibrator 1. This vibrating actuator can enhance the effect of reducing unwanted vibrations occurring on the contact body 4 compared with the configurations of the vibrating actuator illustrated in FIGS. 3A and 3C. In addition, the viscoelastic body 6d can be formed at low cost by a simple method like cutting off a part of a tubular molded article of rubber material or resin material using a die.

FIGS. 3F and 3G illustrates yet another example of the configuration of the vibrating actuator. The configuration of a viscoelastic body 6f illustrated in FIGS. 3F and 3G can further enhance the effect of reducing unwanted vibrations compared with the vibrating actuator illustrated in FIGS. 3D and 3E. FIG. 3F is a front view of the vibrating actuator, illustrating a state where the viscoelastic body 6f is attached to the contact body 4. FIG. 3G is a bottom view thereof. Like the viscoelastic body 6d, the viscoelastic body 6f also has a length of L3 in the y direction, and has a window having a dimension of L4 in the y direction in the bottom of the midsection. As illustrated in the diagrams, the window of the viscoelastic body 6f has a smaller dimension in the x direction than that of the viscoelastic body 6d. More specifically, the viscoelastic body 6f covers part of the frictional sliding surface 4b so that the contact body 4 is covered where the contact of the frictional sliding surface 4b with the ends of the protrusions 2a of the vibrator 1 is not interfered. In other words, the viscoelastic body 6f is fitted to the contact body 4 so that the frictional sliding surface 4b slightly wider than the width of the vibrator 1 is exposed for substantially the same length. The configuration of this vibrating actuator can further enhance the effect of reducing unwanted vibrations occurring on the contact body 4 compared with the configuration of the vibrating actuator illustrated in FIGS. 3D and 3E. The effect of reducing unwanted vibrations ascribable to a plurality of vibration modes such as an in-plane vibration mode and a torsional vibration mode can also be enhanced. Since the window of the viscoelastic body 6f has a smaller dimension in the x direction than that of the viscoelastic body 6d, the effect of reducing unwanted vibrations is also enhanced. The reason is that the adhesion to the contact body 4 can be improved by using the contraction force of the viscoelastic body 6f, compared with the viscoelastic body 6d. Again, the viscoelastic body 6f can be formed at low cost by a simple method like cutting off a part of a tubular molded article of rubber material or resin material using a die.

The foregoing examples have been described by using the out-of-plane bending vibration mode occurring on the contact body 4 illustrated in FIG. 3B as an example. However, the present exemplary embodiment is also applicable to other natural vibration modes such as the in-plane vibration mode and the torsional vibration mode. Vibrations such as in-plane vibrations and torsional vibrations can be reduced in a similar manner to out-of-plane vibrations by disposing a viscoelastic body to cover antinodes where distortion is high.

As illustrated in FIGS. 3C to 3G, the viscoelastic bodies 6 are brought in close contact with the side surfaces of the contact body 4 except for the end portions and the frictional sliding surface. Unwanted vibrations ascribable to various vibration modes having locations (antinodes) where distortion is high at different positions can thus be reduced by covering the positions of the respective antinodes.

Up to this point, configuration examples of the viscoelastic bodies 6 have been described. Like the examples illustrated in FIGS. 3A to 3I, the viscoelastic bodies 6 may be configured to not cover the endmost portions of the long contact body 4. Covering the endmost portions of the contact body 4 with viscoelastic bodies 6 is not much effective in reducing unwanted vibrations. Configurations of not covering the endmost portions of a long contact body with viscoelastic bodies are therefore also included in the scope of the present disclosure. The present exemplary embodiment has been described by using an example where the contact body 4 has an xz cross section of rectangular shape and the four side surfaces other than the surfaces parallel to the xz plane (=endmost portions) are covered to improve the adhesion between the contact body and the viscoelastic bodies.

Figure 5A:
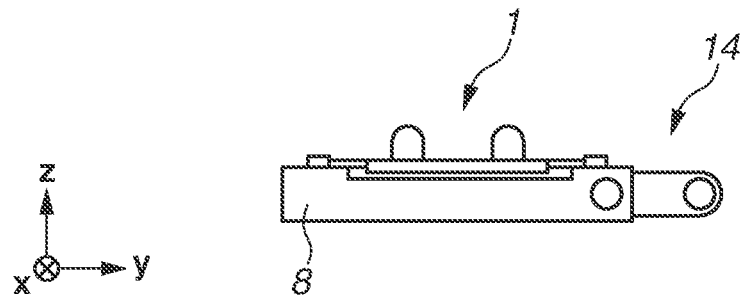
FIGS. 5A to 5C are diagrams for describing a configuration of a connection unit for connecting a vibrator unit.
Figure 5B:
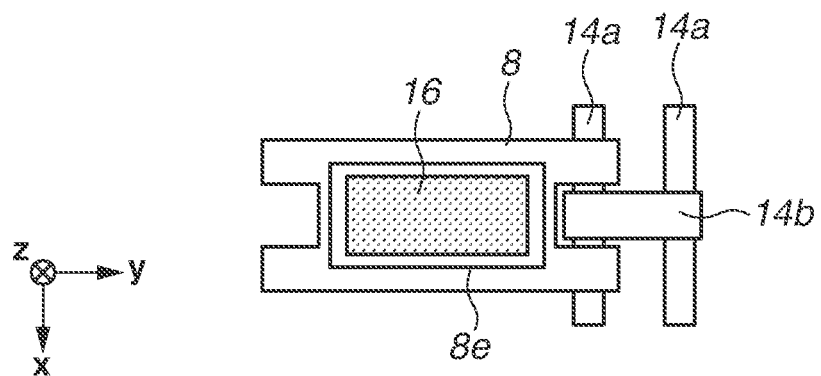
Figure 5C:
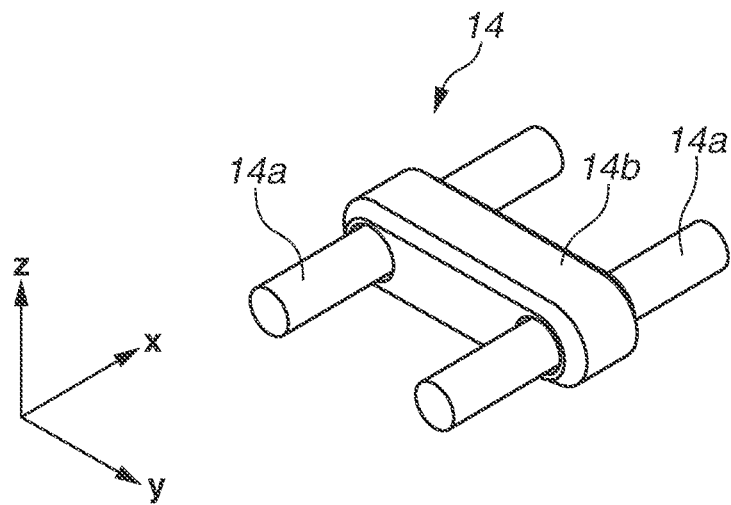

Now, a structure for supporting the contact body 4 and the vibrator 1 of a vibrating actuator 101 according to the present exemplary embodiment will be described by using a specific example and with reference to FIGS. 4 to 5C.

FIG. 4 is a front view illustrating a schematic configuration of a vibrating actuator 101 according to the first exemplary embodiment. The vibrating actuator 101 includes a vibrator unit 5 including the vibrator 1, and the contact body 4 to make contact with the vibrator 1 of the vibrator unit 5.

The vibrator unit 5 includes the vibrator 1, a piece of unwoven fabric 16 (see FIG. 5B), a pressure unit 7, a holding unit 8, a rotational support unit 9, and a reaction force reception unit 10. The vibrator unit 5 includes a pressure support structure capable of exciting vibrations in the vibration modes illustrated in FIGS. 2A and 2B. In the vibrator unit 5, the support ends 2c of the elastic body 2 constituting the vibrator 1 are fixed to the top surfaces of wall portions in the y direction that are side walls of the holding unit 8. The unwoven fabric 16 is disposed on the backside of the electrical-mechanical energy transducer 3 (surface opposite to where the elastic body 2 is bonded). The unwoven fabric 16 is a cloth-like member formed of an unwoven substance such as wool felt, or glass wool. The unwoven fabric 16 supports the vibrator 1 while maintaining the vibration mode(s) occurring on the vibrator 1. The pressure unit 7 presses the vibrator 1 against the contact body 4 via the unwoven fabric 16, whereby the protrusions 2a of the vibrator 1 are brought into contact with the contact body 4. Since the vibrator 1 is fixed to the holding unit 8, the holding unit 8 is pressed toward the contact body 4 integrally with the vibrator 1.

A method for disposing the unwoven fabric 16 will now be described. FIG. 5A is a partial front view of the vibrator unit 5. FIG. 5B is a bottom view of the vibrator unit 5. The holding unit 8 has a through hole 8e running through in the z direction. When the holding unit 8 is viewed from the −z direction side with the vibrator 1 held by the holding unit 8, the electrical-mechanical energy transducer 3 is exposed in the through hole 8e. The unwoven fabric 16 (hatched area in FIG. 5B) is disposed inside the through hole 8e to make contact with the electrical-mechanical energy transducer 3.

In fact, a not-illustrated flexible circuit board for supplying power to the electrical-mechanical energy transducer 3 is attached to the back (surface on the −z direction side) of the electrical-mechanical energy transducer 3. In a strict sense, the unwoven fabric 16 is thus disposed in contact with the flexible circuit board attached to the electrical-mechanical energy transducer 3.

The pressure unit 7 presses the protrusions 2a of the vibrator 1 against the contact body 4 via the unwoven fabric 16 by a predetermined pressing force. For example, the pressure unit 7 is an elastic part having restoring force in the z direction, such as a coil spring, a plate spring, a disk spring, a wave washer, a piece of rubber, and an air tube. FIG. 4 illustrates an example where a compression coil spring is used as the pressure unit 7.

The reaction force reception unit 10 supports the rotational support unit 9, and is configured so that the rotational support unit 9 can rotate in a roller-like manner with respect to the reaction force reception unit 10. The reaction force reception unit 10 and the rotational support unit 9 are disposed to make contact with the top surface of the contact body 4 in the z direction. The top surface is located opposite the contact surface of the contact body 4 with the protrusions 2a. The protrusions 2a of the vibrator 1 receive the reaction force of the pressure force pressing the contact body 4. The contact body 4 is thus supported by the vibrator unit 5 and the reaction force reception unit 10 paired with the rotational support unit 9.

Two reaction force reception units 10 paired with rotational support units 9 are opposed to each other at positions shifted from the foregoing pair in the negative y-axis direction. The three rotational support portions 9 and the one vibrator unit 5 thus sandwich the contact body 4 in the z direction. In the vibrating actuator 101, the reaction force reception units 10 are attached to a support member 15. The rotational support units 9 are supported rotatably about respective axes parallel to the x-axis, and thereby constitute rollers. The support member 15 is a base member for various parts constituting the vibrating actuator 101 to be assembled to. The support member 15 can be configured to accommodate the reaction force reception units 10, the rotational support units 9, the vibrator unit 5, and a part of the contact body 4.

The support member 15 is fixed to a frame of a not-illustrated apparatus, whereby the vibrating actuator 101 can be mounted on the apparatus so that the contact body 4 moves in the y direction with respect to the fixed support member 15.

The contact body 4 is supported by the support member 15 in a state of being movable in the y direction by the thrust received from the vibrator 1 included in the vibrator unit 5. Specifically, four rollers rotatable about respective axes parallel to the z-axis are disposed on the support member 15 as contact body support units 12 for movably supporting the contact body 4. The four contact body support units 12 function as a linear guide for enabling the contact body 4 to move in the y direction while restricting the degree of freedom in the x direction.

The holding unit 8 of the vibrator unit 5 is attached to the support member 15 by a connection unit 14. FIG. 5C is a perspective view illustrating a schematic configuration of the connection unit 14. The connection unit 14 includes a link member 14b (connection portion) and two pins 14a (shaft portions) of circular column shape. The link member 14b has two holes running through in the x direction at a predetermined distance therebetween. The pins 14a are inserted through the two respective holes of the link member 14b and thereby attached to the link member 14b substantially in parallel with each other. The two pins 14a are fixed to the link member 14b at the respective holes of the link member 14b. The two pins 14a and the link member 14b may be integrally (seamlessly) molded in an H-shape when seen in the z direction.

One of the two pins 14a is positioned to a distance of a away from a reference origin O of the support member 15 illustrated in FIG. 4 in the +z direction. This gives the connection unit 14 a rotational degree of freedom with the center axis of the pin 14a positioned to the support member 15 as the rotation center. Meanwhile, the center of the contact body 4 is positioned to a distance of b away in the +z direction from the center of the pin 14a positioned to the support member 15. The contact body 4 is thus precisely positioned to a distance of a+b away from the reference origin O of the support member 15 in the +z direction. Such a configuration enables the vibrator unit 5 to slide in the z direction. The vibrator unit 5 can thus follow the shape of the contact body 4 and be pressed against the contact body 4 even if the contact unit 4 has an undulating shape within the yz plane due to manufacturing errors.

Next, a modification of the vibrating actuator 101 according to the first exemplary embodiment will be described with reference to FIGS. 6A to 6C. A difference from the foregoing vibrating actuator 101 is that both ends of the contact body 4 are fixed to the support member 15.

Figure 6A:
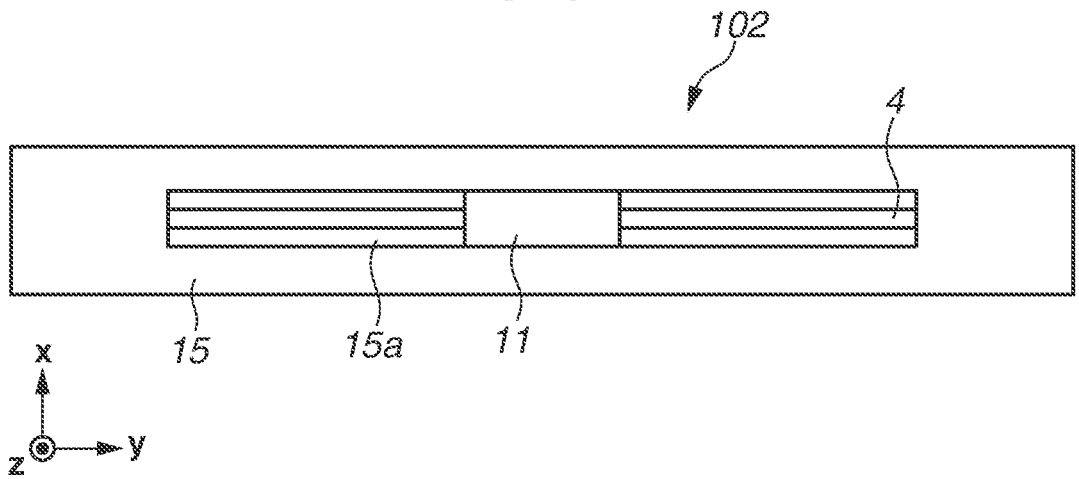
FIGS. 6A to 6C are a plan view, a front view, and a side view illustrating a schematic configuration of a vibrating actuator according to the first exemplary embodiment.
Figure 6B:
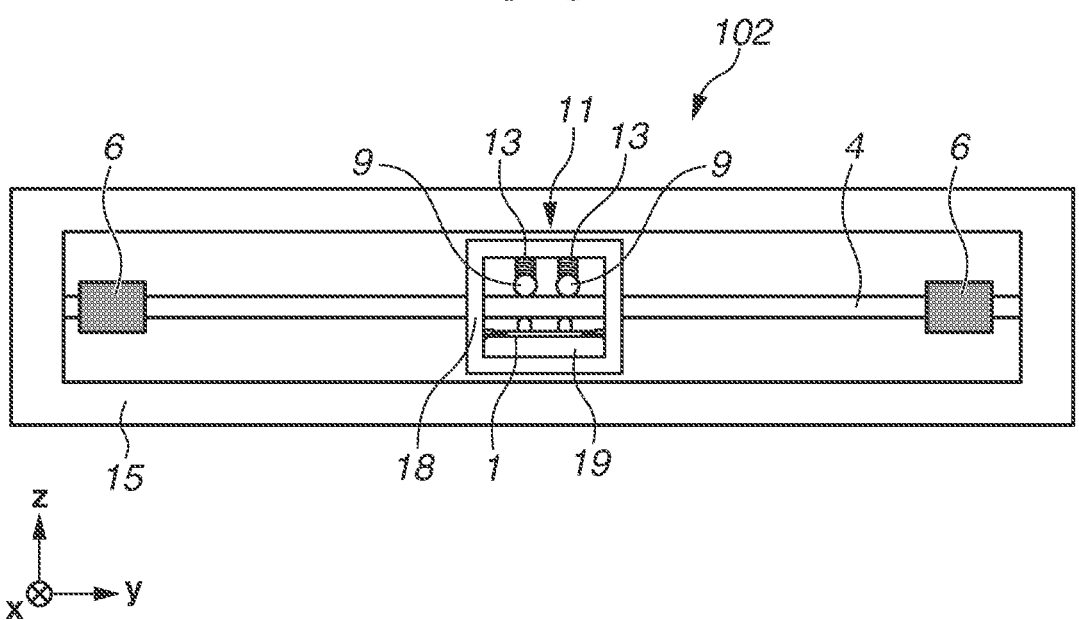

FIGS. 6A and 6B are a plan view and a front view illustrating a schematic configuration of a vibrating actuator 102, respectively. The vibrating actuator 102 includes a vibrator unit 11 and the contact body 4 contacting a vibrator 1 of the vibrator unit 11. In this exemplary embodiment, the contact body 4 is fixed and the vibrator 1 moves relatively. Of the components of the vibrating actuator 102, ones corresponding to those of the vibrating actuator 101 (see FIG. 4) are denoted by the same names and the same reference numerals. A description of the common functions and configurations will be omitted.

The vibrating actuator 102 includes the vibrator unit 11 and the contact body 4. In the vibrating actuator 102, both ends of the contact body 4 are fixed to the support member 15. Two viscoelastic bodies 6 are fitted to the positions of antinodes of the out-of-plane vibration mode occurring on the contact body 4 at frequencies near the driving frequency applied to the vibrator 1. The vibrator unit 11 includes the vibrator 1, a spacer 19, pressure units 13, rotational support units 9, and a holding unit 18 for integrally unitizing these components. In the vibrator unit 11, the spacer 19 to which unwoven fabric 16 is bonded is disposed inside the holding unit 18. The support ends 2c at both ends of the vibrator 1 in the y direction are fixed to the holding unit 18 in a state where the electrical-mechanical energy transducer 3 constituting the vibrator 1 is in contact with the unwoven fabric 16. FIG. 6C illustrates a schematic configuration for describing the supporting relationship between the vibrator unit 11 and the contact body 4.

Figure 6C:
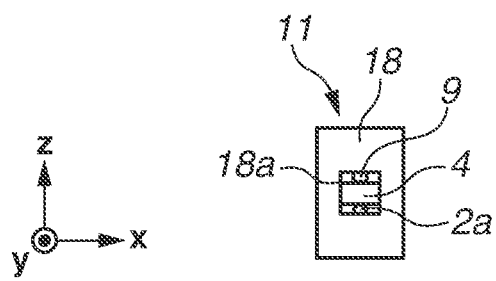

As illustrated in FIG. 6C, the holding unit 18 has openings 18a. The dimension of the openings 18a in the x direction is set to be greater than the width dimension of the contact body 4 in the x direction. Since appropriate clearances are thus provided, the openings 18a function as a linear guide for the vibrator unit 11 to move in the y direction.

The rotational support units 9 are located opposite the contact surface of the contact body 4 with the protrusions 2a (above [on the +z side of] the contact body 4), and receive reaction force to the force for pressing the protrusions 2a of the vibrator 1 against the contact body 4. The rotational support units 9 of the vibrating actuator 102 are supported rotatably about respective axes parallel to the x-axis. Compression coil springs serving as the pressure units 13 are disposed on the rotational support units 9.

The pressure reaction force from the pressure units 13 (extending force of the compression coil springs in the z direction) presses the rotational support units 9 against the contact body 4, and presses the ends of the protrusions 2a of the vibrator 1 against the contact body 4.

With such a configuration, the vibrating actuator 102 can move the vibrator unit 11 in the y direction with respect to the contact body 4. As illustrated in FIG. 6A, the support member 15 has an opening 15a. The top surface of the vibrator unit 11 can thereby be exposed outside, and a not-illustrated object to be driven can be connected to the vibrator unit 11.

In the present exemplary embodiment, a cylindrical or tubular viscoelastic body or bodies 6 formed of rubber is/are described to be fitted to the contact body 4. However, the method for forming the viscoelastic bodies 6 is not limited thereto. Several examples of the method for forming the viscoelastic bodies 6 will now be described. As a first forming method, a tape-like viscoelastic body including a tackiness agent and a base member can be wound around the contact body 4. This method can be easily exercised even after the assembly of the vibrating actuator, and is thus effective as provisional measures against noise occurring during driving. Unwanted vibrations can be effectively reduced by appropriately selecting the thickness and substance of the base member. A second forming method is dipping, or a coating technique of dipping the contact body 4 into liquid rubber or resin. In such a case, the endmost portions of the contact body 4 are covered with the viscoelastic material, but the effect of reducing unwanted vibrations is thereby not particularly impaired. If there is a location where the adhesion of the viscoelastic material by the dipping is inconvenient, the coating with the viscoelastic material can be locally prevented by masking the contact body 4 in advance and removing the mask after the dipping process. A third forming method is insert molding, a technique for placing the contact body 4 in a mold and injecting a thermally molten resin material into around the contact body 4 for integral molding. As a fourth forming method, the contact body 4 and the viscoelastic bodies 6 can be molded by two-color molding (double molding). For example, in the case of molding the contact body 4 out of a resin material as primary molding, PEEK reinforced with approximately 30% of carbon fiber filling can be selected. The viscoelastic bodies 6 can be molded out of an elastomer as secondary molding. The carbon fiber filling is expected to improve the rigidity of the contact body 4 and improve the wear resistance and slidability of the frictional sliding surface. The formation of the viscoelastic bodies 6 using such different means improves mass productivity and enables low-cost formation of the viscoelastic bodies 6, and further provides the effect of enhancing the adhesion of the viscoelastic bodies 6 to the contact body 4 to prevent the viscoelastic bodies 6 from coming off or being displaced. If a mold is used to form the viscoelastic bodies 6, viscoelastic bodies 6 in a complicated shape can be formed by precisely determining the relative position between the viscoelastic bodies 6 and the contact body 4.

In the present exemplary embodiment, the contact body 4 is described to have a straight shape with the y direction as its longitudinal direction. However, the present exemplary embodiment is not limited to such a straight contact body. The contact body 4 can have any curved shape, and unwanted vibrations can be similarly reduced by fitting viscoelastic bodies to the curved contact body 4. Even if the curved contact body 4 is used, the vibrator 1 can be fixed while the contact body 4 serves as an object to be driven. In such a case, contact body support units 12 formed to the shape of the contact body 4 are desirably used. Alternatively, the contact body 4 can be fixed while the vibrator 1 serves as an object to be driven. In such a case, the vibrator unit 5 moves relatively along the curved contact body 4.

A second exemplary embodiment of the present disclosure will be described with reference to FIGS. 7 to 11. As illustrated in the diagrams, an orthogonal coordinate system similar to that of the first exemplary embodiment is set for each vibrating actuator. A similar orthogonal coordinate system is also set for vibrating actuators and actuator units according to other exemplary embodiments to be described below. Of the components of the vibrating actuator, ones having similar functions to those of the first exemplary embodiment are denoted by the same names and the same reference numerals. A description of the common functions and configurations will be omitted.

Figure 7:
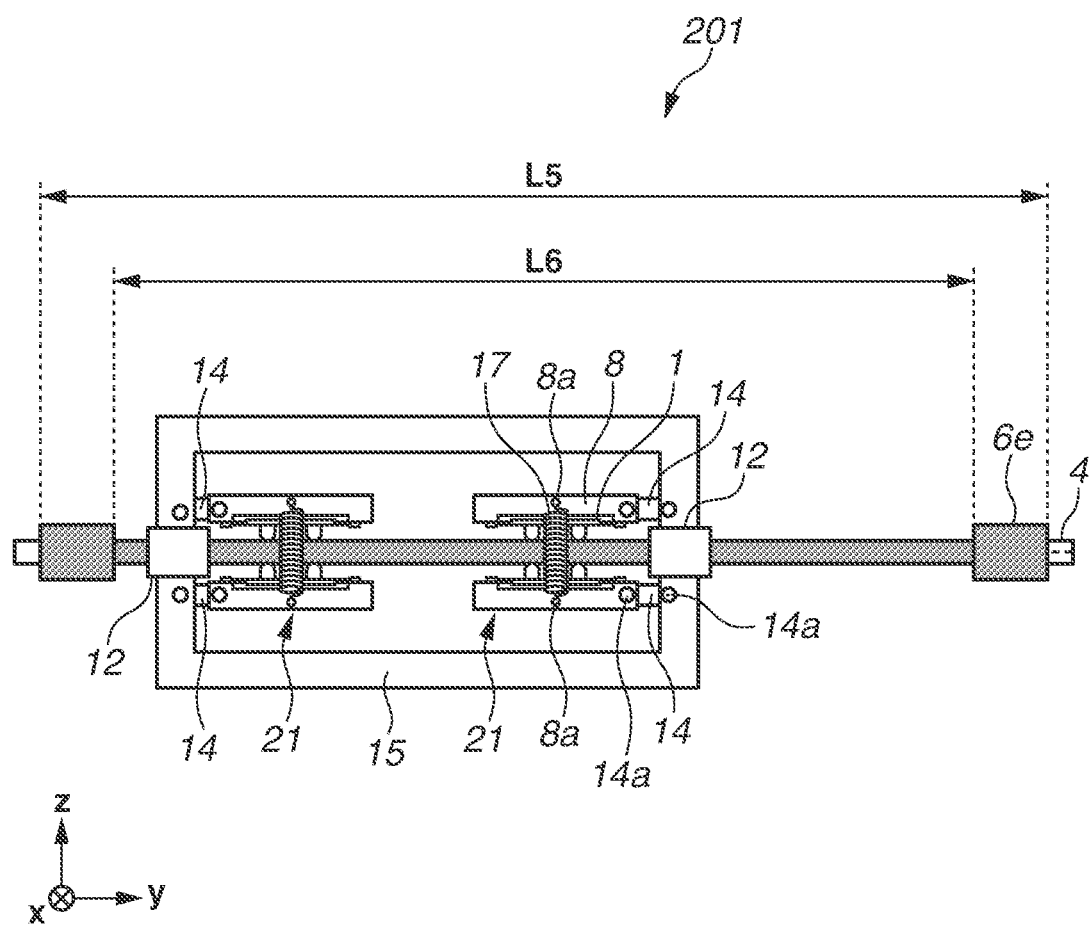
FIG. 7 is a front view illustrating a schematic configuration of a vibrating actuator according to a second exemplary embodiment.

FIG. 7 is a front view illustrating a schematic configuration of a vibrating actuator 201 according to the second exemplary embodiment. The vibrating actuator 201 includes two vibrator units 21 and a contact body 4 contacting the vibrators 1 of the vibrator units 21.

Each vibrator unit 21 includes two vibrators 1, unwoven fabric 16, pressure units 17, and holding units 8. One of the vibrators 1 and the other opposed thereto sandwich and press the contact body 4 therebetween, using a configuration of catching the ends of the pressure units 17 on hooks 8a disposed on the side surfaces of the holding units 8.

In the configuration example illustrated here, tension springs are used as the pressure units 17. Like the method illustrated in FIG. 4, each holding unit 8 is connected to the support member 15 via a connection unit 14, whereby the contact body 4 is positioned in the z direction. This also enables sliding of the vibrators 1 and the holding units 8 in the z direction. The protrusions 2a of the vibrators 1 function to receive reaction force.

A viscoelastic body 6e is attached to the contact body 4. The dimension of the viscoelastic body 6e in the y direction is L5. Windows are formed to expose the sliding surfaces of the contact body 4 within an inner area L6. In other words, the viscoelastic body 6e is attached to make close contact with the two side surfaces of the contact body 4 parallel to the yz plane within the inner area L6, and cover the two side surfaces of the contact body 4 parallel to the yz plane and the surfaces parallel to the xy plane in other areas. The areas represented as L5-L6 where the viscoelastic body 6e covers the four surfaces of the contact body 4 in a long rectangular column shape desirably cover portions corresponding to antinodes of the out-of-plane vibration mode excited on the contact body 4 as described with reference to FIGS. 3A to 3I.

Like the vibrating actuator 101 illustrated in FIG. 4, a contact body unit including the contact body 4 and the viscoelastic body 6e is supported by the support member 15 in a state of being movable in the y direction by thrust received from the vibrators 1 included in the respective vibrator units 21. Specifically, four rollers rotatable about respective axes parallel to the z-axis are disposed on the support member 15 as contact body support units 12 for movably supporting the contact body unit. The four contact body support units 12 restrict the degrees of freedom of the side surfaces of the viscoelastic body 6e within the xy plane in the area L6, and thereby function as a linear guide for enabling movement of the contact body unit in the y direction.

With the foregoing configuration, the vibrating actuator 201 supports the contact body 4 in the z direction using a total of four vibrators 1, and such components as the reaction force reception units 10 and the rotational support units 9 can thus be omitted. Moreover, using the vibrator units 21 instead of the reaction force reception units 10 and the rotational support units 9 not contributing to thrust can increase the thrust of the vibrating actuator 201. The use of the four vibrators 1 can provide thrust four times as much for the same contact body 4. In addition, most of the portions of the contact body 4 not used for frictional sliding are covered with the viscoelastic body 6e. This can enhance the effect of reducing unwanted vibrations occurring on the contact body 4, and prevent the occurrence of noise and a drop in performance due to unwanted vibrations. According to the present exemplary embodiment, a vibrating actuator capable of reducing the occurrence of unwanted vibrations and improving the thrust (output) per volume or weight can thus be provided.

Next, a vibrating actuator 202 according to the second exemplary embodiment will be described with reference to FIGS. 8A and 8B. FIGS. 8A and 8B are a plan view and a front view illustrating a schematic configuration of the vibrating actuator 202, respectively. The vibrating actuator 202 includes vibrator units 22 and a contact body 4 contacting vibrators 1 of the vibrator units 22. In this exemplary embodiment, the contact body 4 is fixed to a support member 15 so that the vibrator units 22 move relative to the support member 15. Of the components of the vibrating actuator 202, ones corresponding to the components described above are denoted by the same names and the same reference numerals. A description of the common functions and configurations will be omitted.

The vibrating actuator 202 includes three vibrator units 22 and a contact body 4. Of the three vibrator units 22, the two at the center and on the right are connected by a connection unit 14. In the vibrating actuator 202, both ends of the contact body 4 are fixed to the support member 15. Three viscoelastic bodies 6g, 6h, and 6i are fitted to the contact body 4 at the positions of antinodes of the out-of-plane vibration mode occurring on the contact body 4 at frequencies near the driving frequency applied to the vibrators 1. Each vibrator unit 22 includes spacers 19 to which unwoven fabric 16 is bonded in the holding unit 18. The spacers 19 have hooks 19a, on which the ends of pressure units 17 are caught to sandwich and press the contact body 4 between a pair of opposed vibrators 1. In each vibrator unit 22, the two vibrators 1 are supported by the holding unit 18 to be slidable in the z direction. The degrees of freedom of the vibrators 1 other than in the z direction are restricted by the holding unit 18. Like the foregoing exemplary embodiment, the holding unit 18 has openings 18a, and function as a linear guide for the vibrator unit 22 to move in the y direction.

Of the three vibrator units 22, the left vibrator unit 22 can be driven in the y direction within a section L7 between the viscoelastic bodies 6g and 6h. Meanwhile, the right and center vibrator units 22 are connected by the connection unit 14 via the holding units 18, and can thus slide slightly from each other in the z direction. Here, the connection unit 14 is desirably located with an offset in the x direction to not interfere with the contact body 4. The two vibrator units 22 connected (hereinafter, referred to as a vibrator unit group 23) can be driven together in the y direction within a section L8 between the viscoelastic bodies 6h and 6i.

With such a configuration, the vibrating actuator 202 can move the vibrator unit 22 and the vibrator unit group 23 in the y direction independent of each other. As illustrated in FIG. 8A, the support member 15 has openings 15b and 15c, from which the top surfaces of the vibrator unit 22 and the vibrator unit group 23 can be exposed outside and objects to be driven can be connected thereto.

According to the present exemplary embodiment, a plurality of vibrator units 22 and/or vibrator unit groups 23 can be independently driven via the one contact body 4. Here, unwanted vibrations excited on the contact body 4 can be more efficiently reduced by fitting the viscoelastic bodies 6 to the contact body 4 at the positions of the antinodes of the out-of-plane vibration mode of the contact body 4.

If two vibrator units 22 are connected to constitute a vibrator unit group 23, a total of four vibrators 1 can generate thrust four times as much. Since the vibrator units 22 are connected to allow a slight relative movement in the z direction, the vibrators 1 can follow the deformation of the contact body 4 in the longitudinal direction (within the yz plane) to reduce variations in the pressure reaction force acting on the respective vibrators 1. Vibrators 1 undergoing smaller pressure reaction force decrease in thrust. Vibrators 1 undergoing larger pressure reaction force are prone to wear and other risks due to overload. Constituting each vibrator unit group 23 using a connection unit 14 as in the present exemplary embodiment thus enables efficient generation of thrust by the vibrators 1. Moreover, in the present exemplary embodiment, the viscoelastic bodies 6 function as buffer members against overload when the vibration unit 22 and the vibrator unit group 23 are driven in the y direction. This can prevent the vibrator units 22 from colliding with the support member 15 or directly with another vibrator unit 22 and getting broken.

In the present exemplary embodiment, a specific method has been described for reducing unwanted vibrations in the vibrating actuator 201 by attaching the viscoelastic body 6e to the contact body 4 of rectangular solid shape in the case where the contact body 4 moves relatively.

Figure 9A:
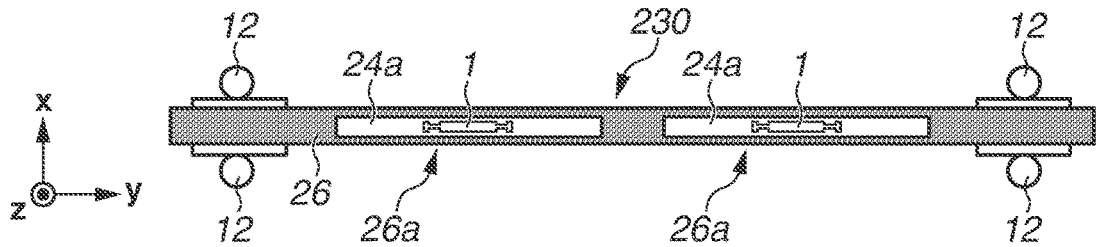
FIGS. 9A to 9F are plan views, front views, and bottom views illustrating schematic configurations of a contact body unit and a contact body according to the second exemplary embodiment.
Figure 9B:
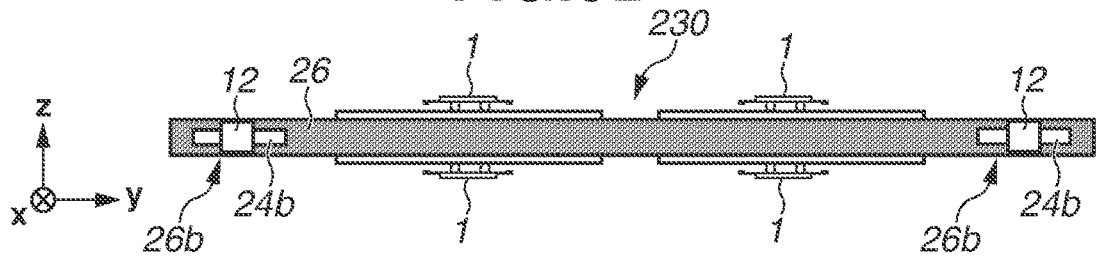
Figure 9C:
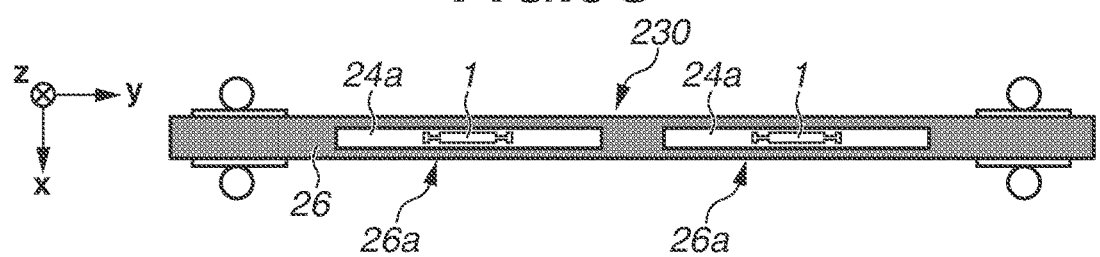
Figure 9D:
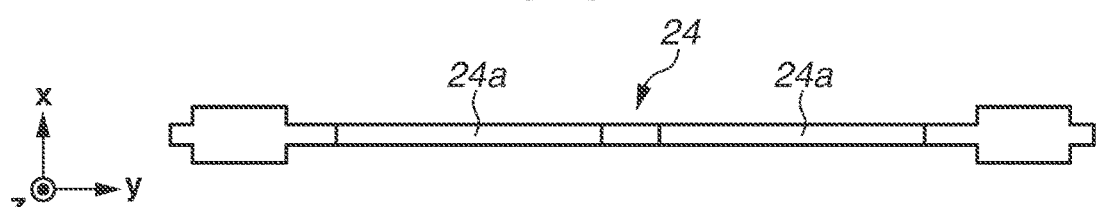
Figure 9E:
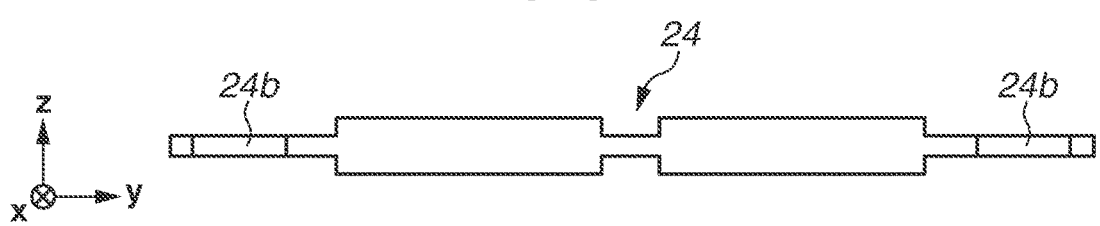
Figure 9F:
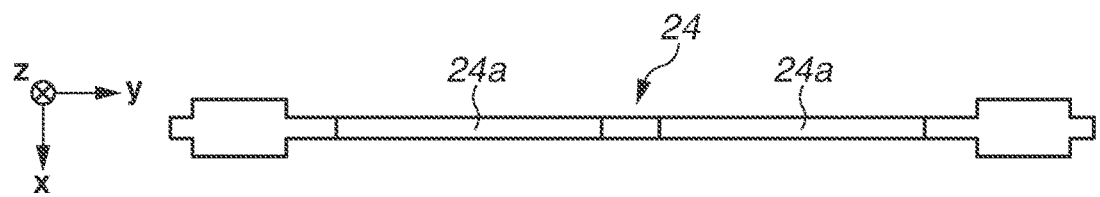

Now, a more developed exemplary embodiment will be described by using a contact body unit 230 combining a contact body 24 and a viscoelastic body 26 illustrated in FIGS. 9A to 9F. FIG. 9A is a plan view, FIG. 9B is a front view, and FIG. 9C is a bottom view illustrating a schematic configuration of the contact body unit 230. FIG. 9D is a plan view, FIG. 9E is a front view, and FIG. 9F is a bottom view illustrating a schematic configuration of the contact body 24. For simplicity of description, components other than the contact body 24, the viscoelastic body 26, the contact body support units 12, and the vibrators 1 are omitted in FIGS. 9A to 9F. The pressure support structure of the contact body 24 by the vibrators 1 is similar to that of the foregoing exemplary embodiment. In FIGS. 9A to 9F, the contact body unit 230 includes the contact body 24 and the viscoelastic body 26. The contact body 24 includes four sliding portions 24a protruding in the positive and negative z directions and four guide portions 24b protruding in the positive and negative x directions. The viscoelastic body 26 has a total of eight windows, including four windows 26a cut out in the positive and negative z directions and four windows 26b cut out in the positive and negative x directions. In FIGS. 9A to 9F, the viscoelastic body 26 is attached to the contact body 24 so that the sliding portions 24a and the guide portions 24b protrude from the windows 26a and the windows 26b, respectively. The sliding portions 24a function as frictional sliding surfaces for the protrusions 2a of the vibrators 1 to be pressed against to generate friction force for driving. The guide portions 24b function as a linear guide for guiding the contact body 24 in the y direction using the four contact body support units 12.

The application of the contact body unit 230 to the vibrating actuator is expected to provide the following effects. The close contact of the viscoelastic body 26 with the side surfaces of the contact body 24 except for the sliding portions 24a and the guide portions 24b can provide a higher effect of reducing unwanted vibrations. Limiting the sliding portions 24a to minimum areas can reduce the cost of grinding (polishing) for obtaining stable frictional sliding characteristics. In addition, since the sliding portions 24a protrude outward from the viscoelastic body 26, the sliding portions 24a can be easily ground (polished) even with the viscoelastic body 26 attached to the contact body unit 230. Meanwhile, since the guide portions 24b protrude outward from the viscoelastic body 26, the rolling resistance can be reduced to reduce loss of the vibrating actuator as compared with the case where the contact body support units 12 rotate on the viscoelastic body 26. Moreover, the amount of displacement of the contact body 24 when an external force acts on the contact body 24 can be reduced as compared with when the contact body support units 12 directly support the viscoelastic body 26. In other words, a high-rigidity linear guide can be formed in the vibrating actuator even in the case where the contact body 24 moves relatively.

In the present exemplary embodiment, the output per unit volume or weight is described to be improved using a plurality of vibrators 1. Next, as configurations applicable to the vibrating actuators according to the foregoing exemplary embodiments, various configurations where a single vibrator unit includes a plurality of vibrators 1 and the protrusions of the vibrators 1 are brought into contact with a contact body to support the contact body will be described. FIGS. 10A to 10F are schematic diagrams for describing structures for supporting a contact body with a plurality of vibrators 1, drawn in a simplified manner as seen in the y direction that is the moving direction of the contact body. Coordinate axes are illustrated in FIG. 10F, and omitted in FIGS. 10A to 10E. The unwoven fabric, spacers, pressure units, and holding units for the vibrators 1 are not illustrated in FIGS. 10A to 10F, whereas ones described in the foregoing exemplary embodiments may be selected and used as appropriate.

Figure 10A:
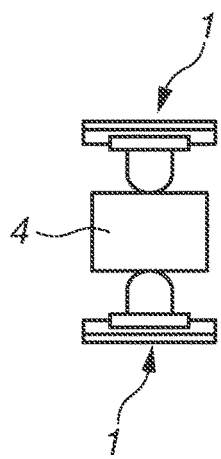
FIGS. 10A to 10F are schematic views for describing methods for supporting a contact body by a plurality of vibrators.
Figure 10B:
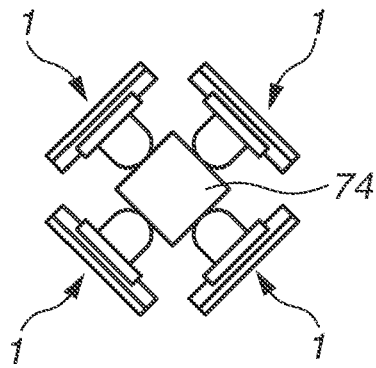
Figure 10C:
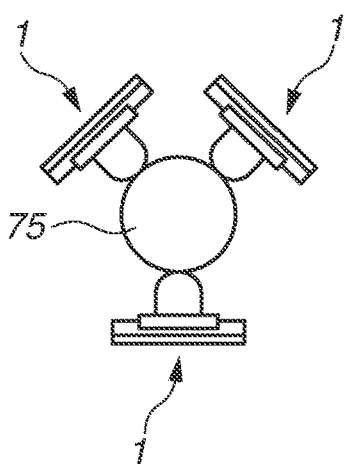

FIG. 10A illustrates a configuration where a contact body 4 is supported with two opposed vibrators 1. This configuration is used in the vibrating actuator 201 (see FIG. 7), for example. FIG. 10B illustrates a configuration where a contact body 74 having a rectangular cross section is supported with vibrators 1 on the respective four side surfaces of the contact body 74. FIG. 10C illustrates a configuration where a substantially cylindrical side surface (curved surface) of a contact body 75 having a substantially circular cross section is supported with three vibrators 1. The three vibrators 1 are arranged at intervals of approximately 120° within the zx plane.

Figure 10D:
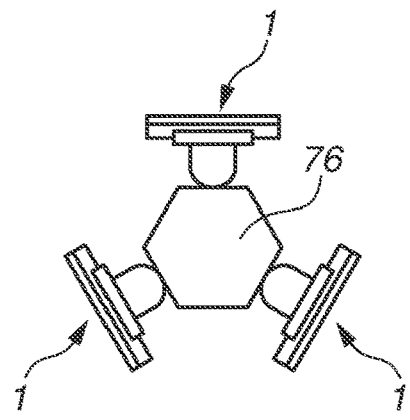
Figure 10E:
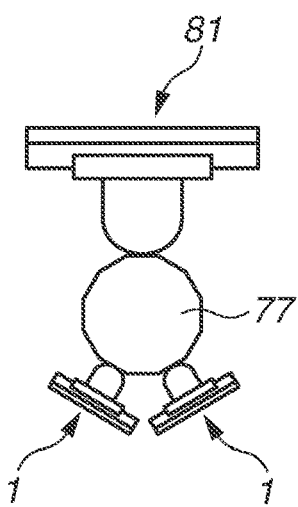
Figure 10F:
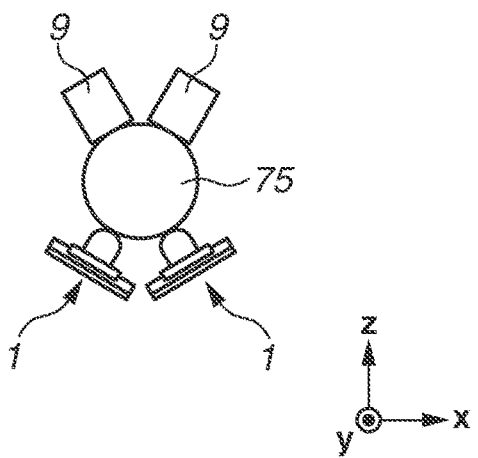

FIG. 10D illustrates a configuration where a contact body 76 having a polygonal cross section is supported with vibrators 1 on three of the side surfaces of the contact body 76. FIG. 10E illustrates a configuration where three of the side surfaces of a contact body 77 having a polygonal cross section are supported with vibrators 1 and 81 having different sizes and thrust. FIG. 10F illustrates a configuration where the substantially cylindrical side surface of the contact body 75 having a substantially circular cross section is supported with two vibrators 1 and two rotational support units 9. Such configurations can be selected and used to appropriately support contact bodies having various cross-sectional shapes with vibrators. Even with the configurations of the vibrators and contact bodies illustrated in FIGS. 10A to 10F, unwanted vibrations can be reduced by applying various exemplary embodiments of the viscoelastic bodies described above.

Figure 11:
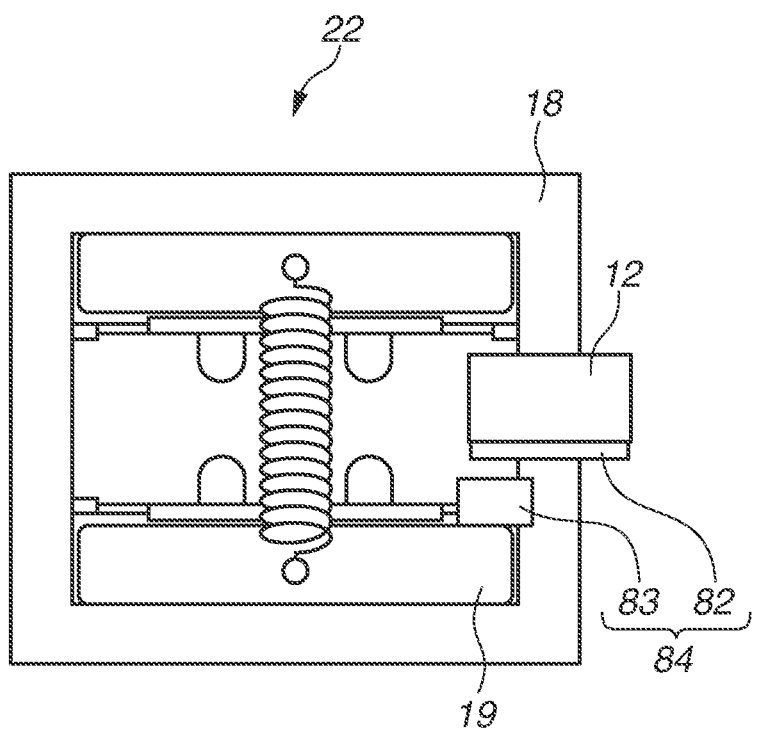
FIG. 11 is a diagram for describing a configuration example where a vibrator unit includes a displacement detection unit.

Next, a configuration example will be described where a vibrator unit to constitute the vibrating actuators according to the foregoing exemplary embodiments includes a displacement detection unit. FIG. 11 is a front view illustrating a state where a displacement detection unit 84 is attached to a vibrator unit 22. While the vibrator unit 22 is described here, the displacement detection unit 84 can also be implemented in other vibrator units.

The displacement detection unit 84 includes a scale 82 and a detector 83. The scale 82 is attached to a contact body support unit 12 disposed on the holding unit 18 at a position not physically interfering with (not contacting) the contact body 4 (not illustrated in FIG. 11). The scale 82 rotates with the roller-shaped contact body support unit 12 as the contact body 4 moves. The detector 83 detects the amount of movement of the contact body 4 in the y direction by reading the rotational displacement of the scale 82. The rotational displacement of the scale 82 can be read by irradiating the scale 82 with light from a light source unit included in the detector 83 and receiving the reflected light with a light reception unit of the detector 83. Driving parameters such as the position, speed, and acceleration of the contact body 4 can be controlled based on the amount of movement of the contact body 4 in the y direction output from the detector 83.

Various displacement detection units including optical, magnetic, and capacitive ones can be used as the displacement detection unit 84. While the displacement detection unit 84 here is described to be of optical reflection type, a displacement detection unit of optical transmission type may be used. A translational displacement detection unit including a translational scale disposed on the contact body 4 and a detector disposed on the vibrator unit 22 may be used instead of the rotary displacement detection unit 84.

FIGS. 12A to 12D are diagrams for describing a schematic configuration of an actuator unit 401 according to a third exemplary embodiment. FIGS. 12A, 12B, 12C, and 12D are a plan view (top view), a side view, a front view, and a perspective view of the actuator unit 401, respectively. Of the components of the actuator unit 401, ones corresponding to those of the foregoing vibrating actuators are denoted by the same names and the same reference numerals. A description of the common functions and configurations will be omitted.

The actuator unit 401 is the vibrating actuator 201 packaged using an exterior member 86. More specifically, in the actuator unit 401, the support member 15 of the vibrating actuator 201 is movably fixed to the inner bottom surface of the exterior member 86. The contact body 4 moves in the y direction through an end surface (zx surface) of the exterior member 86, whereby the power of the contact body 4 is taken out. The contact body 4 and a viscoelastic body 6e of the vibrating actuator 201 are thus exposed outside the exterior member 86 of the actuator unit 401. The vibrator units 21 and other components that are covered with the exterior member 86 and not visible are illustrated in broken lines in FIG. 12C.

Since the vibrating actuator 201 is thus packaged into the actuator unit 401 using the exterior member 86, the user can grip the exterior member 86 for safe handling and the vibrating actuator 201 can be protected. While an example of packaging the vibrating actuator 201 has been described, the vibrating actuators according to the foregoing exemplary embodiments can be all unitized by using the exterior member 86 without exception. The exterior member 86 may be configured integrally with the support member 15.

In the following exemplary embodiments, application examples of the foregoing various vibrating actuators, i.e., various apparatuses (devices) including the vibrating actuators will be described.

Figure 13:
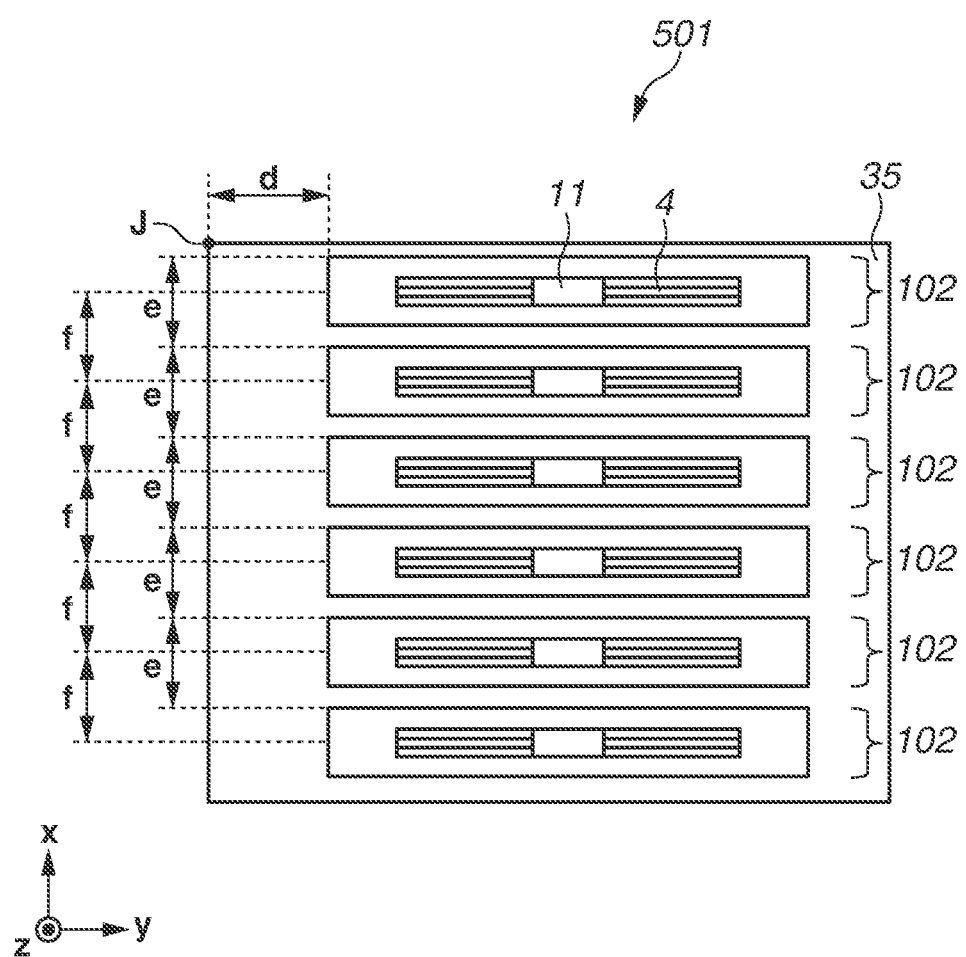
FIG. 13 is a plan view illustrating a schematic configuration of an apparatus according to a fourth exemplary embodiment.

FIG. 13 is a plan view illustrating a schematic configuration of an apparatus 501 according to a fourth exemplary embodiment. The apparatus 501 includes six vibrating actuators 102 and a support member 35. The six vibrating actuators 102 are fixed to the support member 35 via respective support members 15 and with the support members 15 as reference positions. The support member 35 is equivalent to a support member 15 expanded within an xy plane, and is formed as a single member.

Like the apparatus 501, the six vibrating actuators 102 can be easily aligned and disposed on a plane. For example, the six vibrating actuators 102 can be easily aligned and arranged at a distance of d in the y direction from a reference position J of the support member 35 so that the support members 15 adjoin in the x direction at distances of e. In such a case, the distances between the contact bodies 4 of the vibrating actuators 102 adjoining in the x direction can be all set to the same distance f. The vibrator units 11 of the respective six vibrating actuators 102 may be connected to a single driving part (load) or different driving parts (loads).

While the apparatus 501 here is described to include the six vibrating actuators 102, it will be understood that an apparatus similar to the apparatus 501 can be configured using any given number of vibrating actuators 102. Depending on the apparatus configuration, the plurality of vibrating actuators 102 can be disposed at any positions on the same plane or difference planes.

The vibrating actuators 102 according to the present exemplary embodiment can be configured so that the contact bodies 4 have a minimum width dimension in the x direction and unwanted vibrations are reduced by the viscoelastic bodies 6 as described above. Like the apparatus 501, the use of a plurality of vibrating actuators 102 arranged in the x direction thus enables miniaturization of the apparatus. In FIG. 13, the vibrating actuators 102 can be juxtaposed in contact with each other for further miniaturization. A significant reduction in size can also be made by forming the support members 15 constituting the vibrating actuators 102 and the support member 35 as an integral part and reducing the dimension of the support member in the x direction as much as possible without the vibrator units 11 interfering with each other.

Figure 14A:
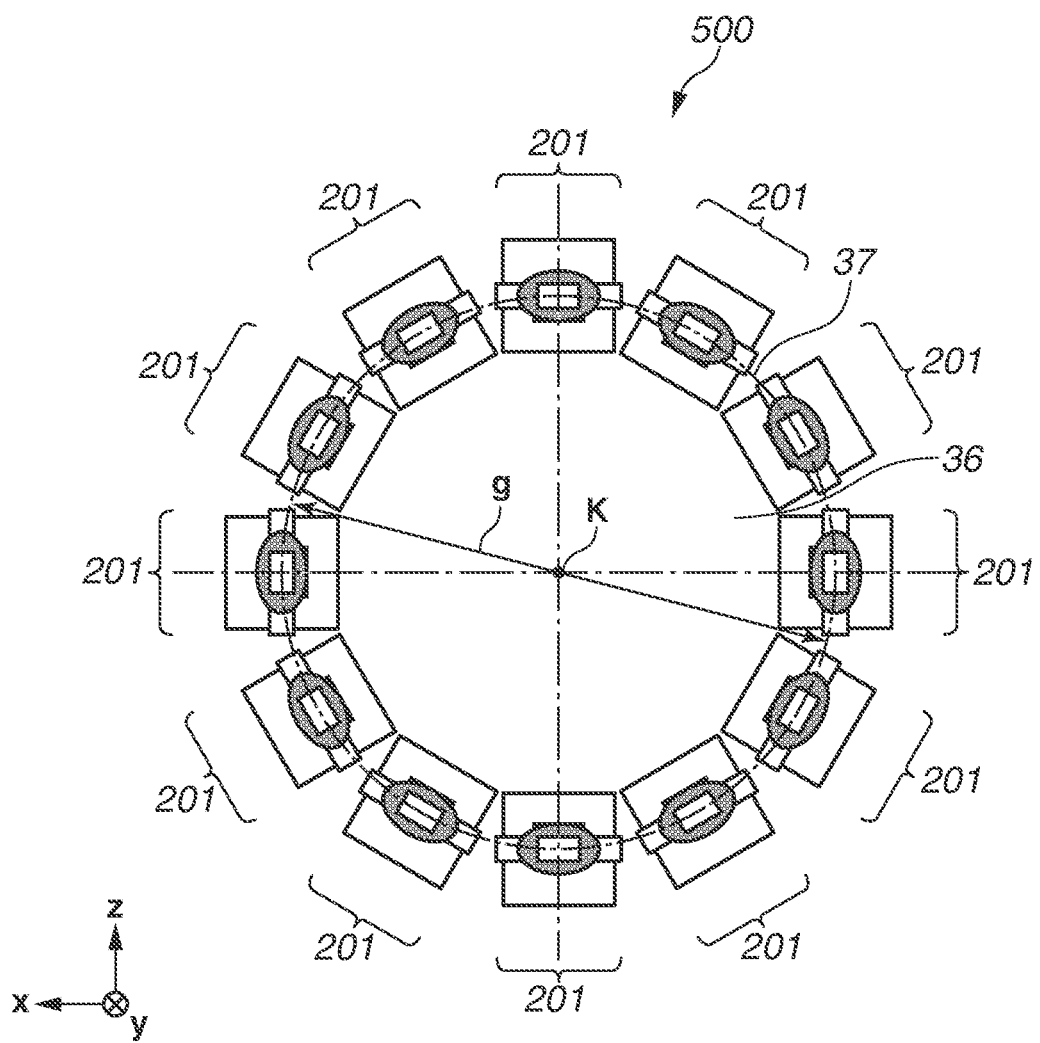
FIGS. 14A and 14B are diagrams for describing a schematic configuration of an apparatus according to a fifth exemplary embodiment.
Figure 14B:
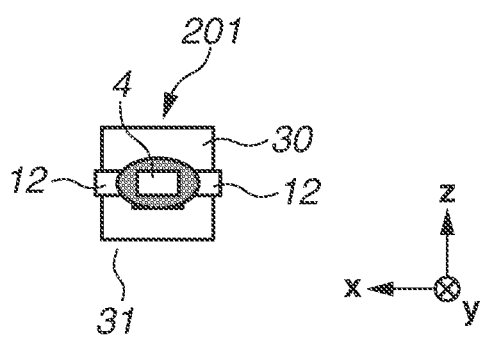

FIG. 14A is a plan view illustrating a schematic configuration of a driving unit 500 according to a fifth exemplary embodiment. FIG. 14B is a side view illustrating a schematic configuration of a vibrating actuator 201 constituting the driving unit 500. The driving unit 500 integrally includes 12 vibrating actuators 201 (see FIG. 7) and a support member 36. The support member 36 is formed by integrating the 12 support members 15 of the 12 vibrating actuators 201 into a single columnar member with the y direction as the axial direction so that its cross section orthogonal to the y direction has a substantially regular dodecagonal shape around a point K. The 12 vibrating actuators 201 are radially fixed to the 12 side surfaces (surfaces parallel to the y-axis) corresponding to the respective sides of the substantially regular dodecagonal shape of the zx cross section of the support member 36 via the support members 15 and with the support members 15 as reference positions. In the driving unit 500, the plurality of contact bodies 4 can thus be precisely arranged on the circumference of a pitch circle 37 having a diameter of g around the point K when seen in the y direction. The diameter g can be reduced to miniaturize the driving unit 500 by minimizing the width dimensions of the contact bodies 4 and reducing unwanted vibrations using the viscoelastic bodies 6 as in the fourth exemplary embodiment. Again, a significant reduction in size can be made by forming the support members 15 constituting the vibrating actuators 102 and the support member 36 as an integral part.

In the driving unit 500, the vibrating actuators 201 are disposed on all the sides of the support member 36. However, vibrating actuators 201 can be disposed at any positions on any sides. The support member 36 is not limited to a dodecagonal column, either, and may be replaced with any polygonal column.

Figure 15:
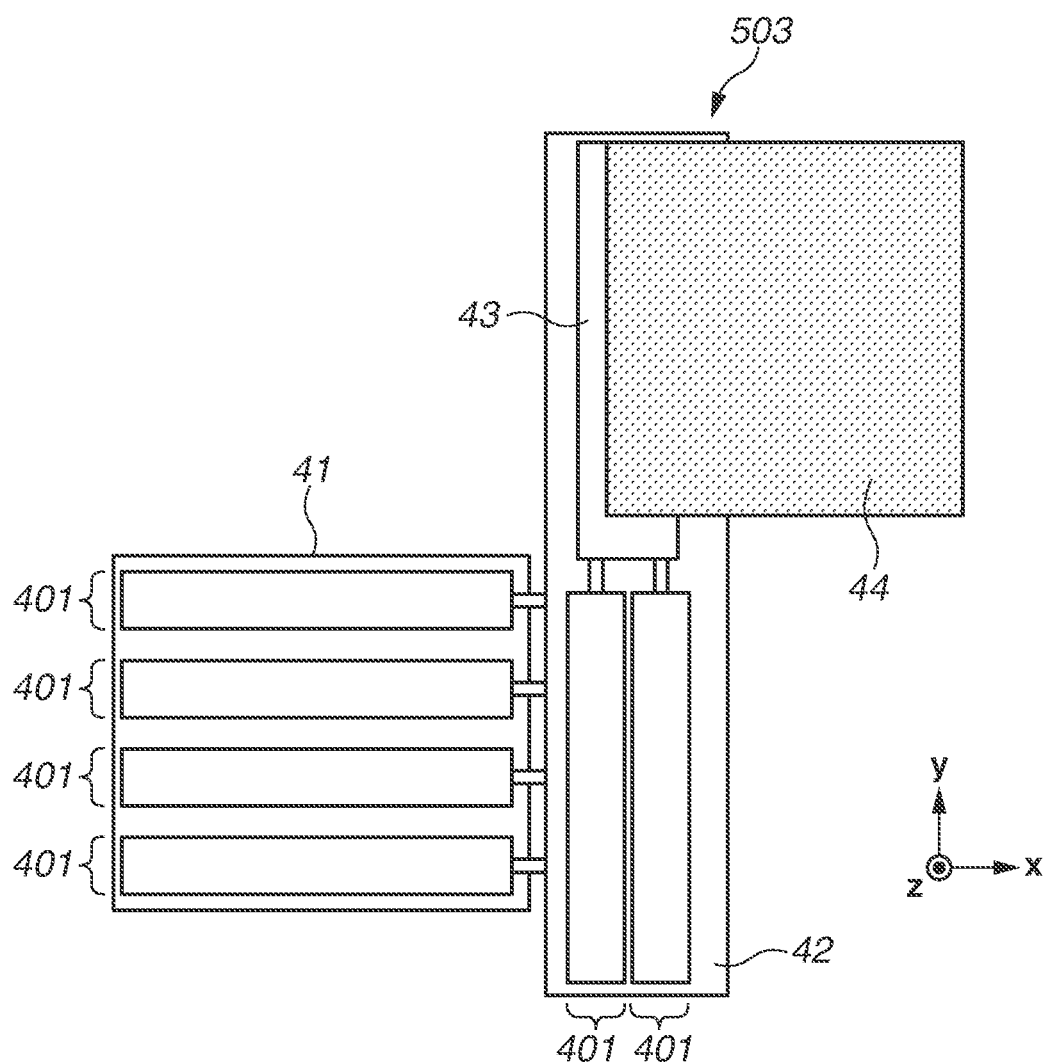
FIG. 15 is a plan view illustrating a schematic configuration of a multi-axis stage according to a sixth exemplary embodiment.

FIG. 15 is a plan view illustrating a schematic configuration of a multi-axis stage 503 according to a sixth exemplary embodiment. The multi-axis stage 503 includes a fixed unit 41, an x stage 42, a y stage 43, and an xy stage 44.

The fixed unit 41 is immovable with the degrees of freedom restricted in all directions. Four actuator units 401 (see FIG. 12D) are arranged in the y direction and fixed to the fixed unit 41 by a similar method to that of the apparatus 501 described with reference to FIG. 13. The four contact bodies 4 of the four actuator units 401 fixed to the fixed unit 41 can move in the x direction in FIG. 15. The right ends of the respective contact bodies 4 are fixed to the x stage 42.

The x stage 42 can move in the x direction alone, with the degrees of freedom in the other directions restricted. The x stage 42 is driven in the x direction by the four actuator units 401 fixed to the fixed unit 41. Two actuator units 401 are arranged in the x direction and fixed to the x stage 42. The two contact bodies 4 of the two actuator units 401 fixed to the x stage 42 can move in the y direction in FIG. 15. The top ends of the respective contact bodies 4 are fixed to the y stage 43.

The y stage 43 can move in the y direction alone, with the degrees of freedom in the other directions restricted. The y stage 43 is driven in the y direction by the two actuator units 401 fixed to the x stage 42. The xy stage 44 is fixed to the y stage 43. The xy stage 44 moves within the xy plane with the movement of the x stage 42 and/or the y stage 43.

The mass for the actuator units 401 disposed on the fixed unit 41 to move is greater than that for the actuator units 401 disposed on the x stage 42 to move. In view of this, the numbers of actuator units 401 disposed on the fixed unit 41 and the x stage 42 can be set depending on the mass of the objects to be moved. While the multi-axis stage 503 is configured as a two-degree-of-freedom xy stage, a stage having any number of degrees of freedom can be implemented using a plurality of actuator units 401.

The multi-axis stage 503 is configured to move the object to be driven in predetermined directions using the plurality of actuator units 401. This prevents the occurrence of moment within a plane parallel to the xy plane. As a result, the xy stage 44 can be precisely moved within the xy plane.

Again, in the present exemplary embodiment, the fixed unit 41 and the x stage 42 can be miniaturized by minimizing the width dimensions of the contact bodies 4 and reducing unwanted vibrations using the viscoelastic bodies 6.

Figure 16:
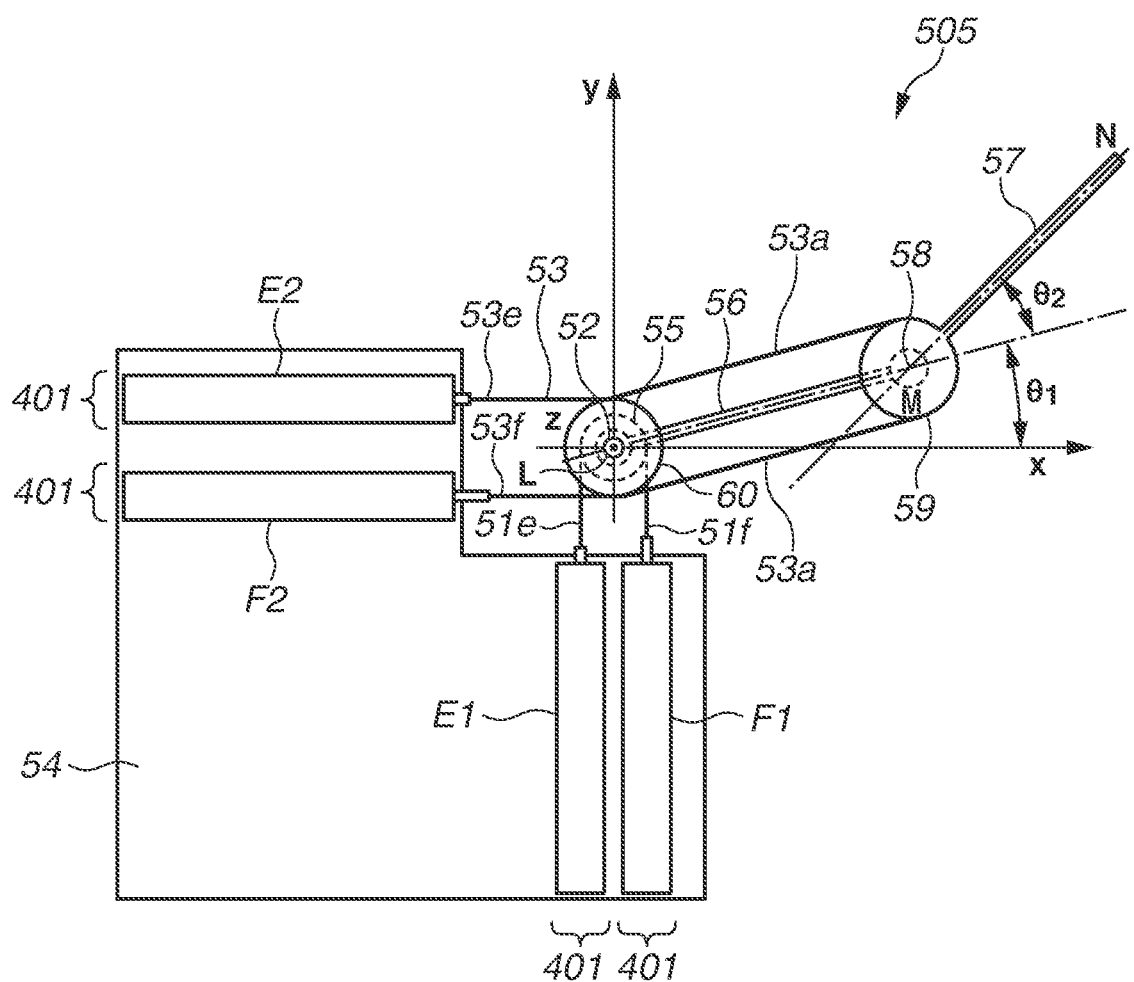
FIG. 16 is a plan view illustrating a schematic configuration of an articulated robot according to a seventh exemplary embodiment.

FIG. 16 is a plan view illustrating a schematic configuration of an articulated robot 505 according to a seventh exemplary embodiment. The articulated robot 505 is an example of an articulated robot using an antagonistic driving method. The articulated robot 505 includes a first joint 52, a fixed unit 54, a first pulley 55, a first link 56, a second link 57, a second joint 58, a second pulley 59, a third pulley 60, a wire 51e, a wire 51f, a wire 53a, a wire 53e, and a wire 53f. In the following description, to distinguish a plurality of actuator units 401 disposed on the fixed unit 54, the respective actuator units 401 will be denoted by the reference symbols E1, F1, E2, and F2.

The first joint 52 has a rotational degree of freedom capable of rotation about a shaft parallel to a z-axis with a point L at the center. The second joint 58 has a rotational degree of freedom capable of rotation about a shaft parallel to the z-axis with a point M at the center, and is restricted by the movement of the first link 56. The first pulley 55 illustrated in a broken line is restricted by the first link 56 and disposed to be rotatable about the first joint 52. The second link 57 is disposed via the second joint 58 to be rotatable about the second joint 58. The second pulley 59 is restricted by the second link 57. The third pulley 60 is disposed to be rotatable about the first joint 52.

The wire 51e is wound around the first pulley 55. One end of the wire 51e is bonded to the contact body 4 of the actuator unit F1, and the other end is bonded to the contact body 4 of the actuator unit E1. The wire 53e is wound around the third pulley 60. One end of the wire 53e is bonded to the contact body 4 of the actuator unit F2, and the other end is bonded to the contact body 4 of the actuator unit E2. The wire 53a is formed in an endless shape (annular shape), and disposed across the second pulley 59 and the third pulley 60.

The actuator units E1 and F1 disposed with the moving directions of their contact bodies 4 in the y direction in FIG. 16 each drive the wire 51e in the y direction. If the actuator unit E1 and F1 generate thrust in the y direction without slackening the wire 51e, a difference in the generated thrust produces friction force between the wire 51e and the first pulley 55, whereby the first link 56 can be rotated about the first joint 52. The actuator units E1 and F1 can thus displace the first link 56 by an angle $\theta_1$ with respect to the x-axis.

Similarly, the actuator units E2 and F2 disposed so that their contact bodies 4 can move in the x direction in FIG. 16 each drive the wire 53e in the x direction. If the actuator units E2 and F2 generate thrust in the x-axis direction without slackening the wire 53e, a difference in the generated thrust produces friction force between the wire 53e and the third pulley 60. The friction force rotates the third pulley 60, and the second pulley 59 is moved accordingly via the endless wire 53a, whereby the first link 56 and the second link 57 can be driven about the first joint 52 and the around the second joint 58.

In other words, the actuator units E2 and F2 can displace the first link 56 by the angle $\theta_1$ with respect to the x-axis in FIG. 16, and displace the second link 57 by an angle $\theta_2$ with respect to the first link 56 as well. Here, the second link 57 alone can be displaced as much as the angle $\theta_2$ by driving the actuator units E1 and F1 to offset the displacement of the first link 56 as much as the angle $\theta_1$ caused by the driving of the actuator units E2 and F2.

The articulated robot 505 can thus bring the tip N of the second link 57 to a target position within the xy plane by driving the plurality of actuator units 401. Antagonistically driving the wires 51e and 53e while constantly applying tension to not slacken the wires 51e and 53e can prevent the occurrence of deviations due to play around the joints 52 and 58 and buckling of the wires 51e and 53e. As a result, torsional rigidity around the joints 52 and 58 can be improved. In addition, the tip N can be positioned with high precision.

Again, in the present exemplary embodiment, the fixed unit 54 can be miniaturized by minimizing the width dimensions of the contact bodies 4 and reducing unwanted vibrations using the viscoelastic bodies 6.

Figure 17:
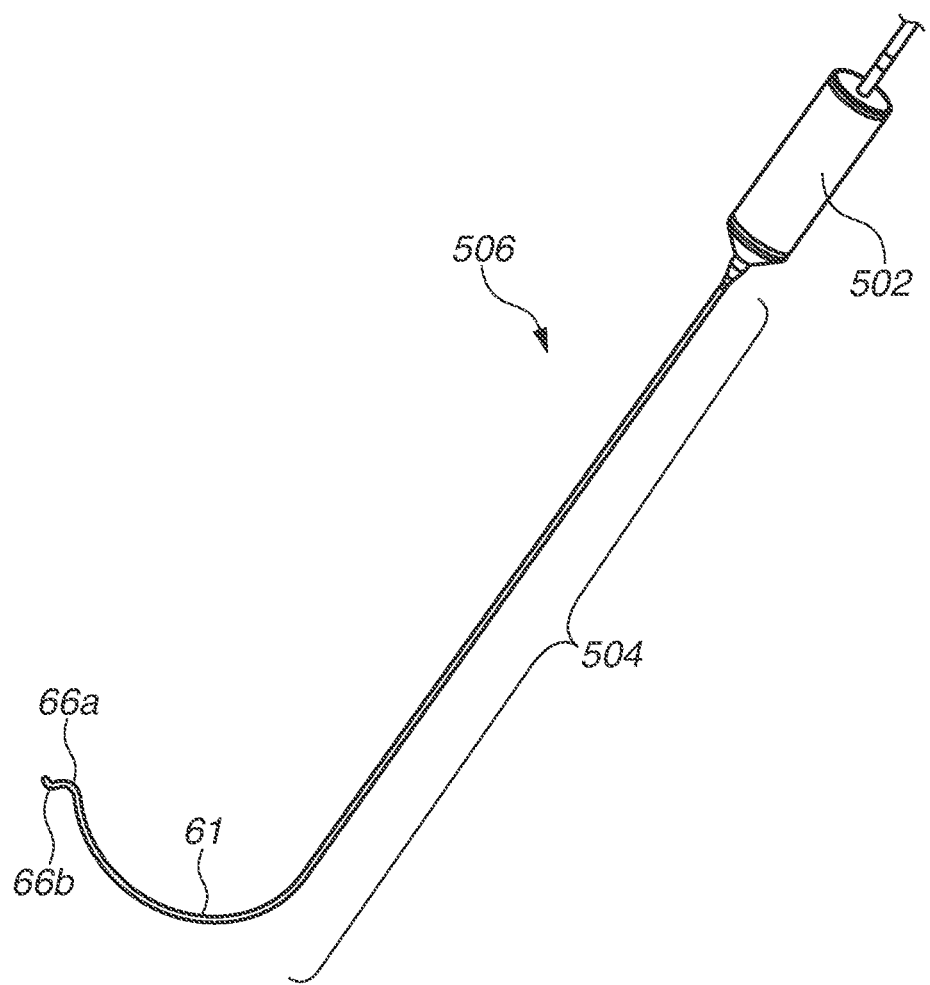
FIG. 17 is a plan view illustrating a schematic configuration of a continuum robot according to an eighth exemplary embodiment.

FIG. 17 is a plan view illustrating a schematic configuration of a continuum robot 506 according to an eighth exemplary embodiment. While the articulated robot 505 according to the seventh exemplary embodiment is operated by the antagonistic driving method, the continuum robot 506 is operated by a driving method of pushing and pulling wires within the range of thrust not buckling the wires.

The continuum robot 506 includes a base unit 502 and a wire-driven manipulator 504.

Figure 18:
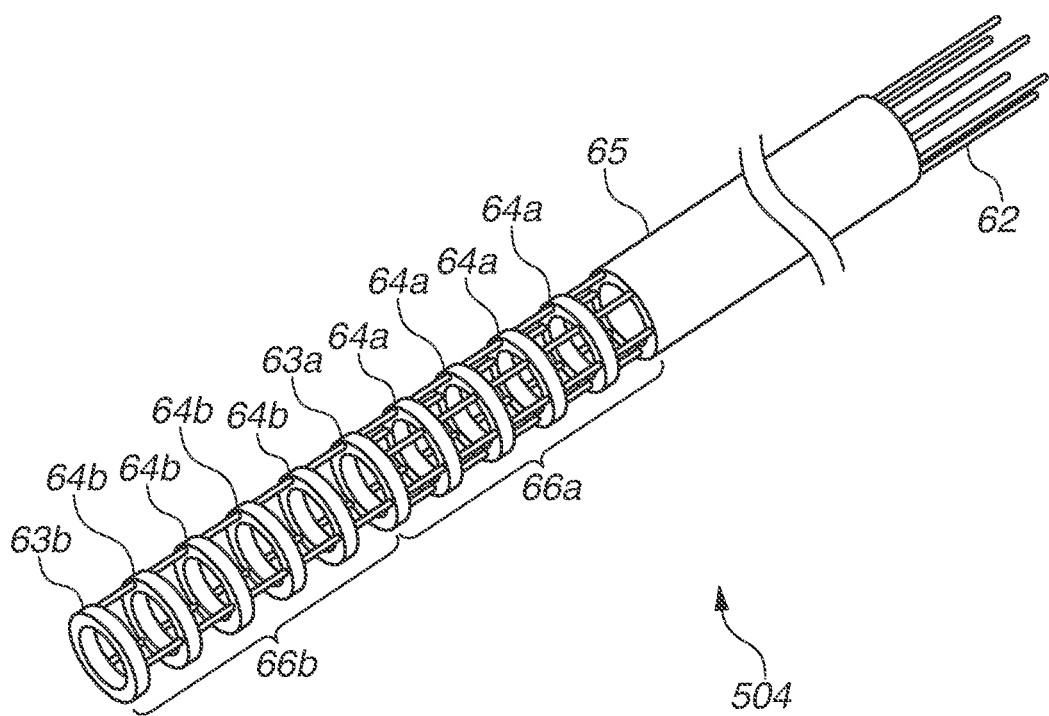
FIG. 18 is a perspective view illustrating a schematic configuration of a wire-driven manipulator of the continuum robot according to the eighth exemplary embodiment.

FIG. 18 is a perspective view illustrating a schematic configuration of the wire-driven manipulator 504. The wire-driven manipulator 504 is equivalent to the one discussed in Japanese Patent Application Laid-Open No. 2018-140101, for example. The wire-driven manipulator 504 includes an intermediate section 61 and two bending sections 66a and 66b. Linear members 62 can change the curvatures of the bending sections 66a and 66b by sliding through the hollow portion of a guide pipe 65 disposed in the intermediate section 61 without buckling. As illustrated in FIG. 17, the intermediate section 61 may be a flexible member.

The wire-driven manipulator 504 includes three linear members 62 per bending section. Specifically, the ends of three of six linear members 62 are fixed to a guide member end member 63a. One of the three linear members 62 is fixed to guide members 64a, and the curvature of the bending section 66a is changed by driving the other two. Similarly, the ends of the remaining three linear members 62 are fixed to an end member 63b. One of the three linear members 62 is fixed to guide members 64b, and the curvature of the bending section 66b is changed by driving the other two.

The continuum robot 506 includes a driving unit 500 that is incorporated in the base unit 502 as a driving source of the wire-driven manipulator 504 (see FIGS. 14A and 14B). The contact bodies 4 of the vibrating actuators 201 accommodated in the base unit 502 are bonded to the respective linear members 62 and used as driving sources for changing the curvatures of the bending sections 66a and 66b of the wire-driven manipulator 504. Like the configuration described with reference to FIGS. 12A to 12D, the base unit 502 is desirably packaged using an exterior member, whereby the internal parts can be appropriately protected and the operability can be improved.

The continuum robot 506 can drive the wire-driven manipulators 504 using the driving unit 500 incorporated in the base unit 502 to precisely control the curvatures of the bending sections 66a and 66b. Since the driving unit 500 for driving the wire-driven manipulator 504 is accommodated in the base unit 502, the operability can be improved by reducing the driving unit 500 in size and weight. Moreover, the output requirements for the bending sections 66a and 66b can be easily met by adjusting the number of vibrator units 21 in the base unit 502. In addition, the responsivity can be improved by driving the linear members 62 of the wire-driven manipulator 504 using the vibrating actuators 201 of direct drive type, as compared with the case of using driving units combining electromagnetic motors and reduction gears.

The output from each of the vibrating actuators 201 accommodated in the base unit 502 can be easily changed by increasing or decreasing the number vibrator units 21. Moreover, the magnitude of the thrust for driving (bending) the bending sections 66a and 66b and the driving speed thereof can also be controlled by changing the ratio of the amplitudes of vibrations in the plurality of vibration modes excited on the vibrators 1. With no voltage applied to the electrical-mechanical energy transducers 3, the orientation of the bending sections 66a and 66b can be maintained by static friction force acting between the protrusions 2a and the contact bodies 4.

Furthermore, the vibrators 1 can be driven in the second vibration mode (FIG. 2B) to change the friction force acting between the protrusions 2a and the contact bodies 4 so that when external force is applied to the bending sections 66a and 66b, the orientation of the bending sections 66a and 66b changes to follow the external force. Such a function can be used as a safety mechanism in using the continuum robot 506 for medical purposes, for example. If the vibrators 1 are thus driven in the second vibration mode (FIG. 2B) alone to significantly reduce the friction force between the vibrators 1 and the contact bodies 4, large vibration amplitudes are desirably set. Typically, as the vibration amplitude of unwanted vibrations is greater, the output gets lower and the produced noise louder with the vibration amplitude setting higher. As described in the foregoing exemplary embodiments, unwanted vibrations can be reduced by fitting viscoelastic bodies 6 to the contact bodies 4 without increasing the size of the vibrating actuators 201. Such a safety mechanism can thus be implemented by using the vibrating actuators 201 according to the present exemplary embodiment.

Examples of applications of the continuum robot 506 include industrial endoscopes, medical endoscopes, and surgical instruments used for treatment, biopsy, inspection, and other medical practices like a catheter. While the continuum robot 506 is configured to include two bending sections 66a and 66b with four degrees of freedom, the number of bending sections, i.e., the degrees of freedom can be freely set. The bending section 66b is a distal bending section, and the bending section 66a is a follow-up bending section.

Here, the shape of the support member 36, the diameter g of the pitch circle 37, and the number and layout of vibrating actuators 201 can be set to appropriate conditions with respect to the base unit 502 based on the number of bending sections and the diameters of the guide members.

For example, in the foregoing exemplary embodiment, the objects to be connected to the vibrator units by the connection units are described to be other vibrator units or support members. However, this is not restrictive, and any portions and parts capable of relative movement with respect to the contact bodies may be coupled. Moreover, while the multi-axis stage 503, the articulated robot 505, and the continuum robot 506 have been described as examples of apparatuses to which the vibrating actuators and actuator units according to the foregoing exemplary embodiments are applied, examples of the applicable apparatuses are not limited thereto. Other examples of the apparatuses according to the foregoing exemplary embodiments may include various stage apparatuses such as a microscope, a machine tool, and a measurement instrument, vertical articulated robots having more degrees of freedom than the articulated robot 505, and parallel link robots.

The exemplary embodiments of the present disclosure have been described in detail above. However, the present disclosure is not limited to these specific exemplary embodiments, and various electronic apparatuses not departing from the gist of the disclosure are also included in the present disclosure. Moreover, the foregoing exemplary embodiments demonstrate just a few exemplary embodiments of the present disclosure, and the exemplary embodiments can be combined as appropriate.

According to an exemplary embodiment of the present disclosure, a small-sized vibrating actuator capable of reducing the occurrence of unwanted vibrations can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-141411, filed Aug. 31, 2021, which is hereby incorporated by reference herein in its entirety.

What is claimed is:

1. A vibrating actuator comprising:
a vibrator including an elastic body and an electrical-mechanical energy transducer; and
a contact body that is long in a predetermined direction and configured to contact the vibrator,
wherein the vibrator and the contact body are configured to be relatively moved in the predetermined direction by vibration of the vibrator,
wherein an end portion of the contact body is covered with a viscoelastic body circumferentially with respect to the predetermined direction.

2. The vibrating actuator according to claim 1, wherein a total length of the viscoelastic body in the predetermined direction is greater than or equal to a one-half wavelength of a vibration wave in a natural mode of vibration including an out-of-plane vibration excited on the contact body by the vibration of the vibrator.

3. The vibrating actuator according to claim 1,
wherein a natural mode of vibration excited on the vibration body is an out-of-plane bending vibration mode producing a plurality of node lines in the predetermined direction, and
wherein a total length of the viscoelastic body in the predetermined direction is greater than or equal to a distance between adjoining node lines in the plurality of node lines.

4. The vibrating actuator according to claim 1,
wherein the elastic body includes a plurality of protrusions, and
wherein a total length of the viscoelastic body in the predetermined direction is greater than or equal to a distance between centers of adjoining protrusions.

5. The vibrating actuator according to claim 1, wherein the viscoelastic body is disposed at both ends of the contact body.

6. The vibrating actuator according to claim 1, wherein the viscoelastic body is located to cover an antinode in a natural mode of vibration including an out-of-plane vibration excited on the contact body without the viscoelastic body being disposed on the contact body.

7. The vibrating actuator according to claim 1,
wherein the viscoelastic body is a hollow member having a hole, and
wherein an inner periphery of the hole in the viscoelastic body in a state where the viscoelastic body is not attached to the contact body is smaller than a total peripheral length of the contact body in a cross section orthogonal to the predetermined direction.

8. The vibrating actuator according to claim 1, wherein the viscoelastic body has a first window cut out to allow the vibrator and the contact body to contact each other via the first window.

9. The vibrating actuator according to claim 8, further comprising a contact body support unit configured to support the contact body movably in the predetermined direction,
wherein the viscoelastic body has a second window cut out to expose a guide portion where the contact body and the contact body support unit contact each other.

10. The vibrating actuator according to claim 9, wherein the guide portion is configured to contact the contact body support unit via the second window.

11. The vibrating actuator according to claim 1, further comprising a holding unit,
wherein the vibrator is held by the holding unit, and
wherein a width dimension of the viscoelastic body is less than that of the vibrator or that of the holding unit in a cross section of the vibrating actuator orthogonal to the predetermined direction.

12. The vibrating actuator according to claim 1, further comprising a plurality of vibrators that include the vibrator,
wherein the plurality of vibrators is configured to move in the predetermined direction relative to a common contact body to which the viscoelastic body is attached.

13. The vibrating actuator according to claim 1, wherein the viscoelastic body is formed of a rubber material.

14. The vibrating actuator according to claim 1, wherein an endless viscoelastic body covering a side surface of the contact body is attached to a part of the contact body.

15. The vibrating actuator according to claim 14, wherein the viscoelastic body has a window cut out to expose the part of the contact body.

16. The vibrating actuator according to claim 15, wherein the part of the contact body protrudes from the window.

17. An actuator unit comprising:
the vibrating actuator according to claim 1; and
an exterior member configured to accommodate a part of the vibrating actuator inside,
wherein a part of the contact body of the vibrating actuator is exposed outside the exterior member.

18. An electronic apparatus comprising:
the vibrating actuator according to claim 1; and
a part configured to be driven by the vibrating actuator.

19. The electronic apparatus according to claim 18, wherein a plurality of vibrating actuators include the vibrating actuator and is radially arranged in a cross section orthogonal to the predetermined direction.

20. A multi-axis stage comprising:
the vibrating actuator according to claim 1;
a fixed unit to which the vibrating actuator is fixed; and
a stage connected to the contact body and configured to move in the predetermined direction relative to the fixed unit.

21. An articulated robot comprising:
the vibrating actuator according to claim 1,
wherein the vibrating actuator is configured to operate as a driving source of the articulated robot.

22. A continuum robot comprising:
the vibrating actuator according to claim 1; and
a wire-driven manipulator,
wherein the vibrating actuator is configured to operate as a driving source of the wire-driven manipulator.

* * * * *